United States Patent
Kim et al.

(10) Patent No.: US 12,493,175 B2
(45) Date of Patent: *Dec. 9, 2025

(54) FLYING-OVER BEAM PATTERN SCANNING HOLOGRAM MICROSCOPE DEVICE USING SPATIAL MODULATION SCANNER AND TRANSLATION STAGE

(71) Applicant: CUBIXEL CO., LTD., Seoul (KR)

(72) Inventors: Tae Geun Kim, Seoul (KR); Seung Ram Lim, Seoul (KR); Kyung Beom Kim, Seoul (KR); Eung Joon Lee, Seoul (KR); Dong Hwan Im, Seoul (KR)

(73) Assignee: CUBIXEL CO., LTD., Seoul (KR)

( * ) Notice: Subject to any disclaimer, the term of this patent is extended or adjusted under 35 U.S.C. 154(b) by 220 days.

This patent is subject to a terminal disclaimer.

(21) Appl. No.: 18/034,882

(22) PCT Filed: Mar. 7, 2022

(86) PCT No.: PCT/KR2022/003160
§ 371 (c)(1),
(2) Date: May 1, 2023

(87) PCT Pub. No.: WO2022/225177
PCT Pub. Date: Oct. 27, 2022

(65) Prior Publication Data
US 2023/0400673 A1 Dec. 14, 2023

(30) Foreign Application Priority Data

Apr. 22, 2021 (KR) ........................ 10-2021-0052337

(51) Int. Cl.
*G02B 21/00* (2006.01)
*G02B 21/36* (2006.01)
*G03H 1/00* (2006.01)

(52) U.S. Cl.
CPC ..... *G02B 21/0044* (2013.01); *G02B 21/0032* (2013.01); *G02B 21/0056* (2013.01);
(Continued)

(58) Field of Classification Search
CPC ............ G02B 21/0044; G02B 21/0032; G02B 21/0056; G02B 21/006; G02B 21/364;
(Continued)

(56) References Cited

U.S. PATENT DOCUMENTS

| 12,436,376 B2 * | 10/2025 | Kim ................ G02B 21/361 |
| 2019/0294106 A1 * | 9/2019 | Cheng ............. G03H 1/0005 |
| 2023/0324667 A1 * | 10/2023 | Kim ................ G02B 21/0032 |
| | | 356/457 |

FOREIGN PATENT DOCUMENTS

| CN | 108267945 A | * 7/2018 | .......... G03H 1/0005 |
| KR | 10-2010-0125014 A | 11/2010 | |

(Continued)

OTHER PUBLICATIONS

Claim set for U.S. Appl. No. 18/024,493, dated Jul. 14, 2025. (Year: 2025).*

(Continued)

*Primary Examiner* — Arnel C Lavarias
(74) *Attorney, Agent, or Firm* — Revolution IP, PLLC

(57) ABSTRACT

A flying-over beam pattern scanning hologram microscope device includes: a scan beam generation unit which converts of a first beam and a second beam to a first spherical wave; a scanning unit, which includes a spatial modulation scanner for controlling the scan beam in the horizontal direction, and a translation stage for moving an object in the vertical direction at the rear end of the projection unit; the projection unit projecting the scan beam onto an object plane; and a (Continued)

light collection unit which detects a beam that has passed through the objective lens again after being reflected or fluoresced from the object.

20 Claims, 12 Drawing Sheets

(52) U.S. Cl.
CPC ......... G02B 21/006 (2013.01); G02B 21/364 (2013.01); G03H 1/0005 (2013.01); *G03H 2001/005* (2013.01)

(58) Field of Classification Search
CPC .. G02B 21/00; G02B 21/0004; G02B 21/002; G02B 21/0036; G02B 21/0048; G02B 21/06; G02B 21/36; G02B 21/361; G02B 5/32; G03H 1/0005; G03H 2001/005
USPC ....... 359/368, 362, 363, 369, 370, 379, 380, 359/385, 389, 390, 423, 434, 577, 1, 15, 359/17, 19, 35
See application file for complete search history.

(56) References Cited

FOREIGN PATENT DOCUMENTS

| KR | 10-2013-0081127 A | 7/2013 | |
|---|---|---|---|
| KR | 10-1304695 B1 | 9/2013 | |
| KR | 2016-500530 A | 1/2016 | |
| KR | 10-1830785 B1 | 2/2018 | |
| KR | 10-2019-0000056 A | 1/2019 | |
| KR | 10-2020-0053182 A | 5/2020 | |
| WO | 2020-007761 A1 | 1/2020 | |
| WO | WO-2022055194 A1 * | 3/2022 | ............... G02B 3/08 |

OTHER PUBLICATIONS

International Search Report for PCT/KR2022/003160 mailed Jun. 23, 2022 from Korean Intellectual Property Office.
Kim, You Seok et al., "Auto-focus of Optical Scanning Holographic Microscopy Using Partial Region Analysis", Optical Society of Korea, Feb. 4, 2011, vol. 22, No. 1, pp. 10-15.
Zhang et al., "Annular pupil in optical scanning holography", In: Digital Holography and Three-Dimensional Imaging, 2019, Optical Society of America, May 23, 2019, pp. 1-2.

* cited by examiner

[FIG. 1A]
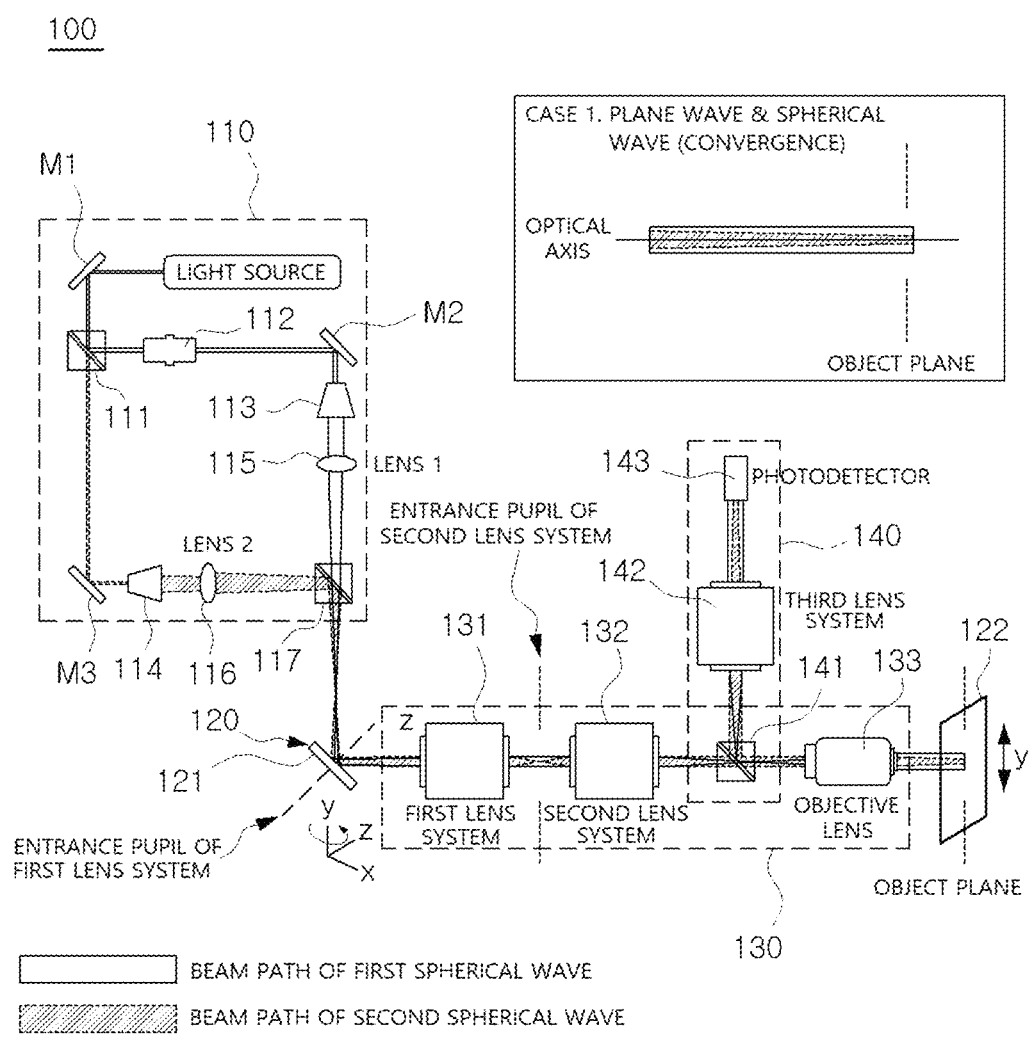

[FIG. 1B]
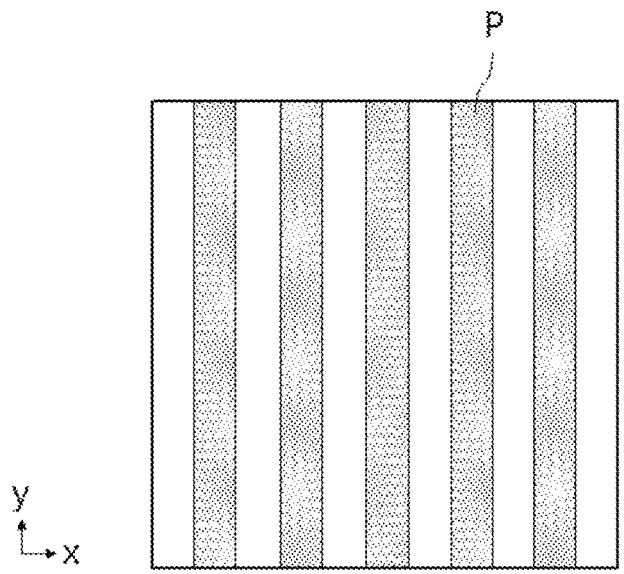
[FIG. 2]
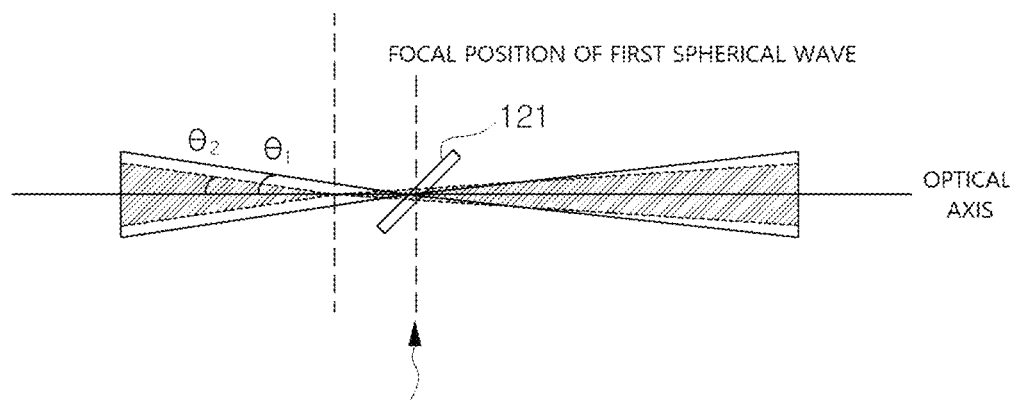

[FIG. 3A]
PLANE MODEL OF CARDINAL POINT OF GENERAL OPTICAL SYSTEM
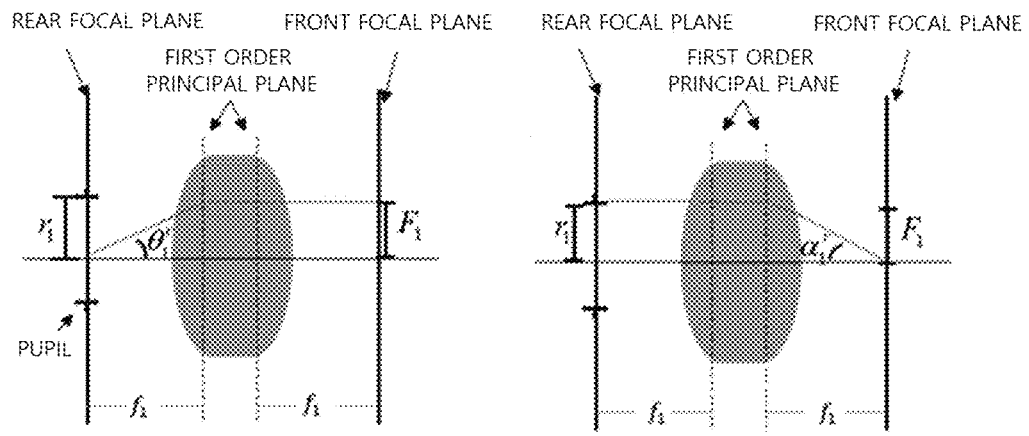
[FIG. 3B]
PLANE MODEL OF APLANATIC POINT OF GENERAL OPTICAL SYSTEM
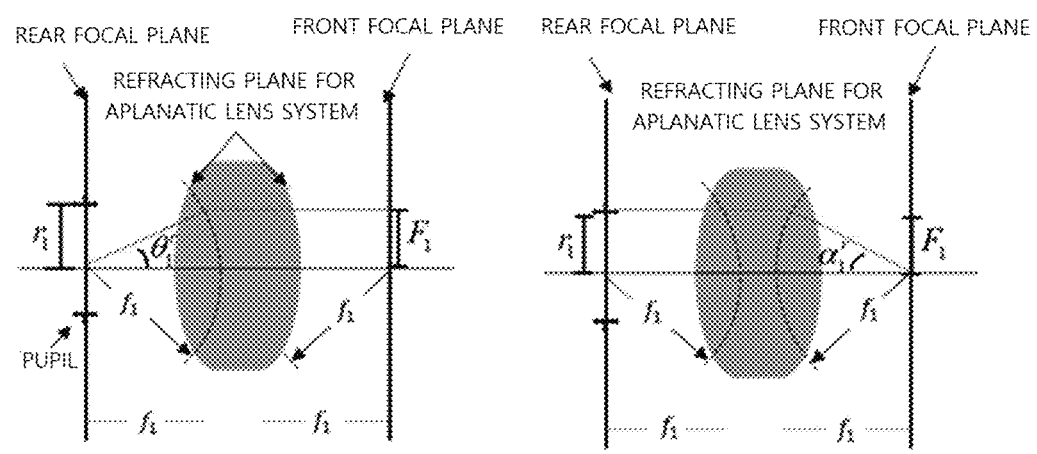

[FIG. 4]
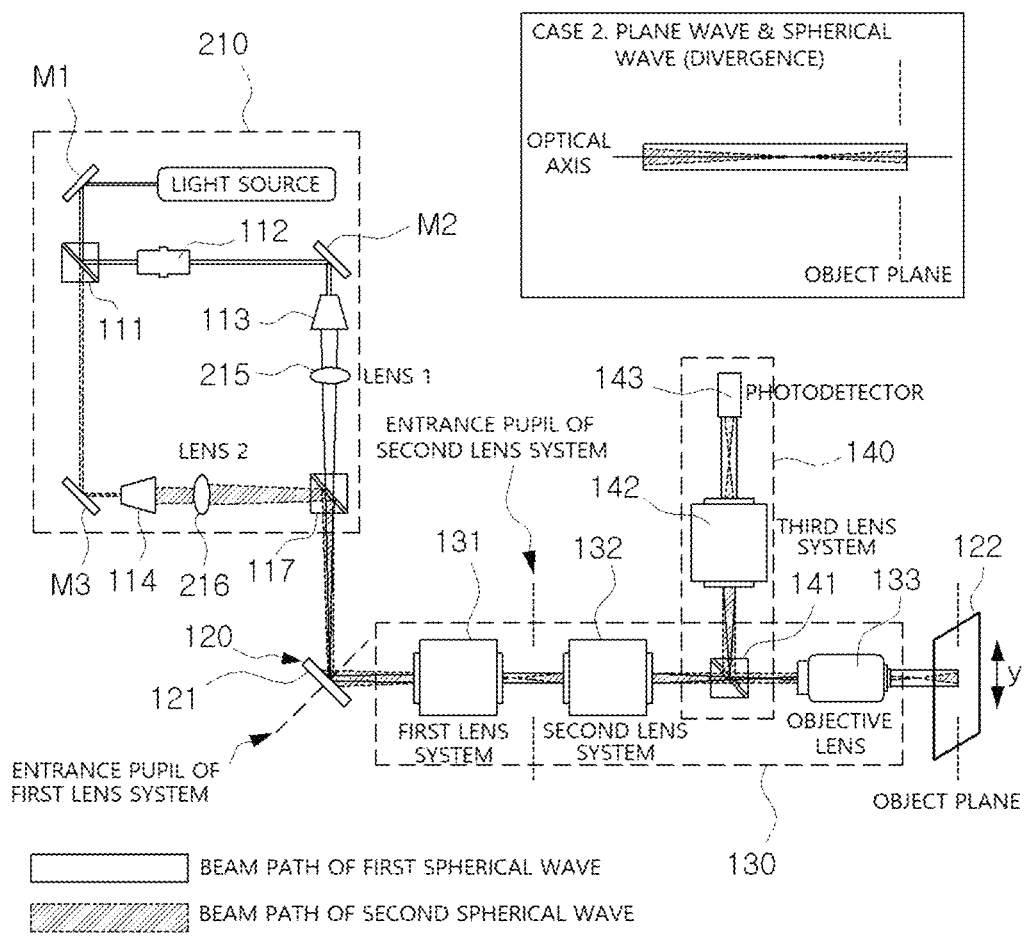

[FIG. 5]
CASE 2
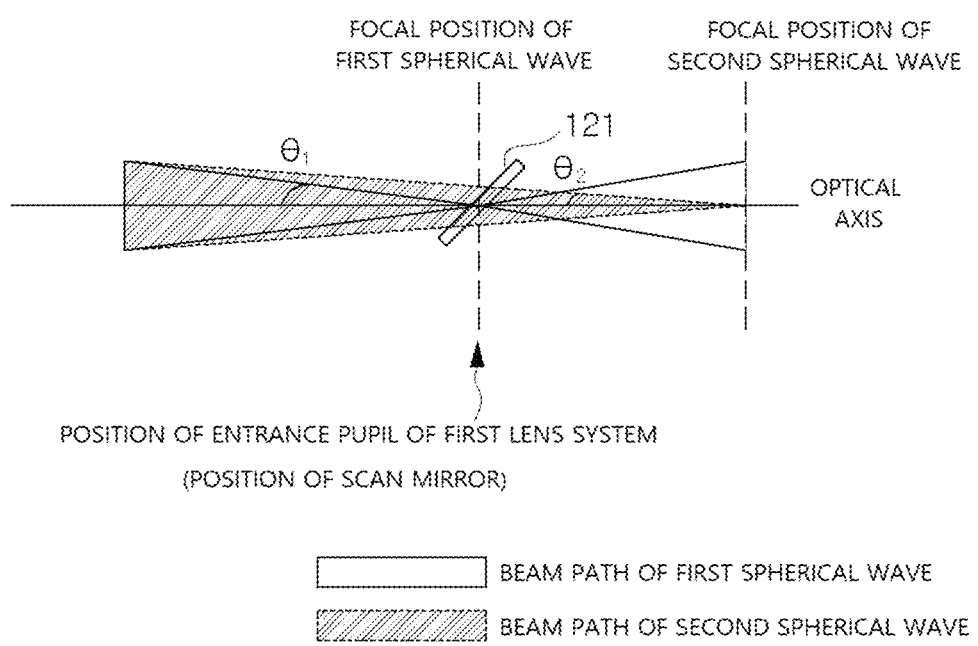

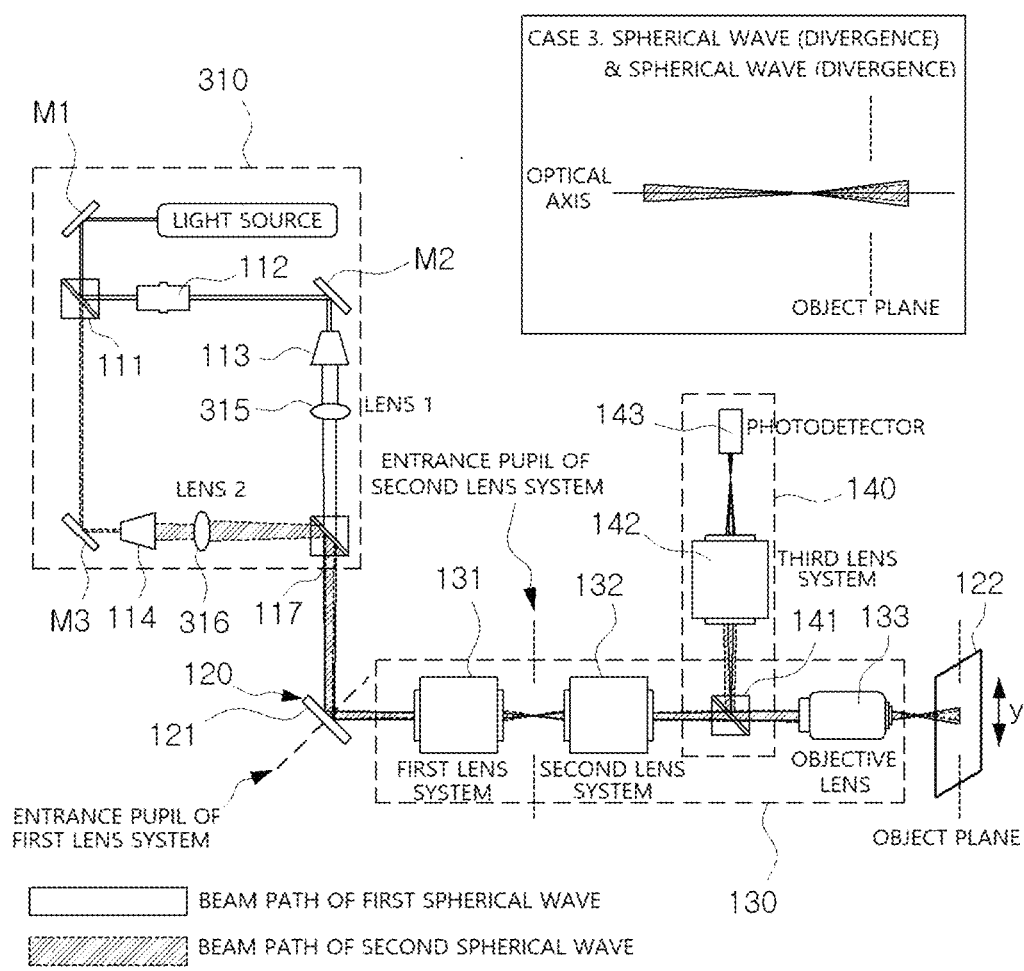
[FIG. 6]

[FIG. 7]
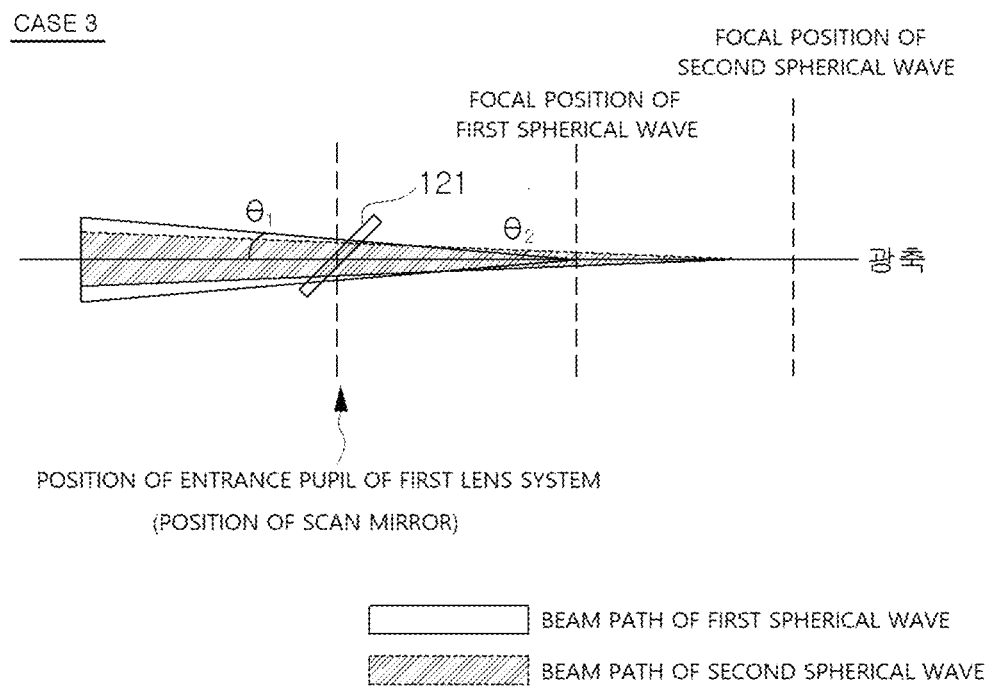

[FIG. 8]
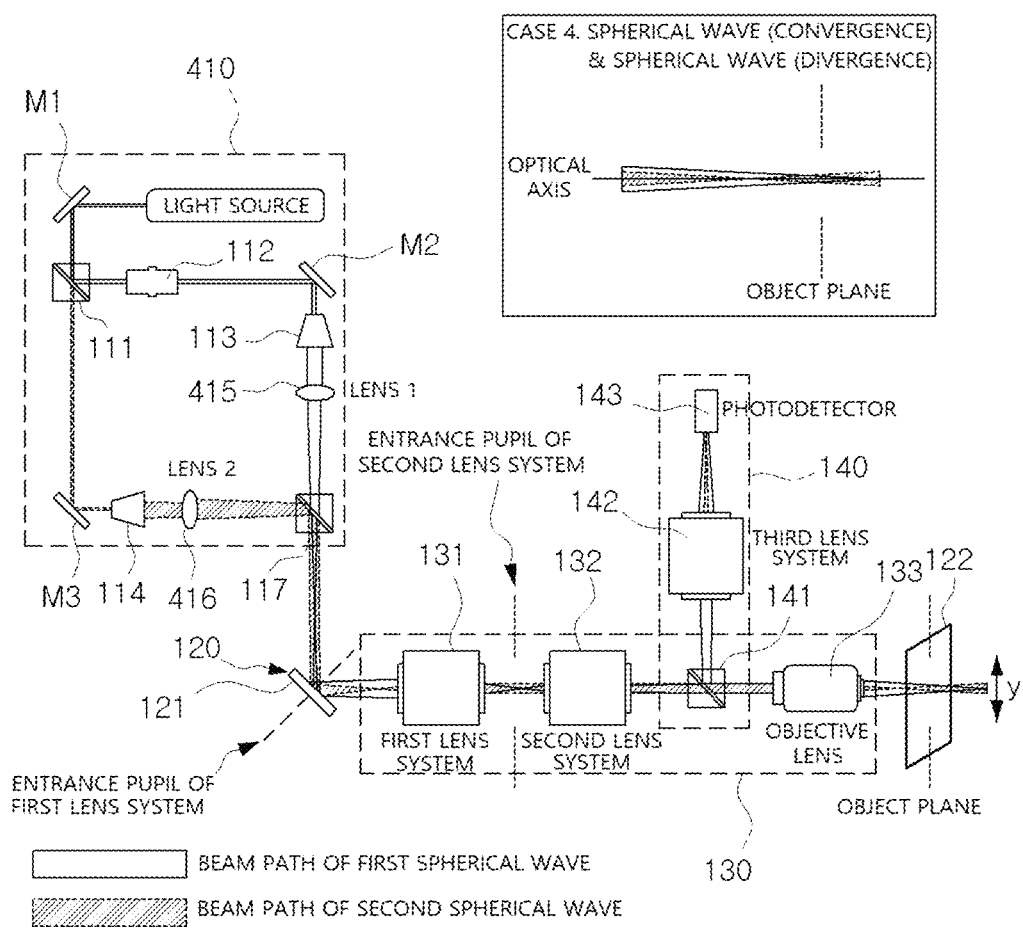

[FIG. 9]
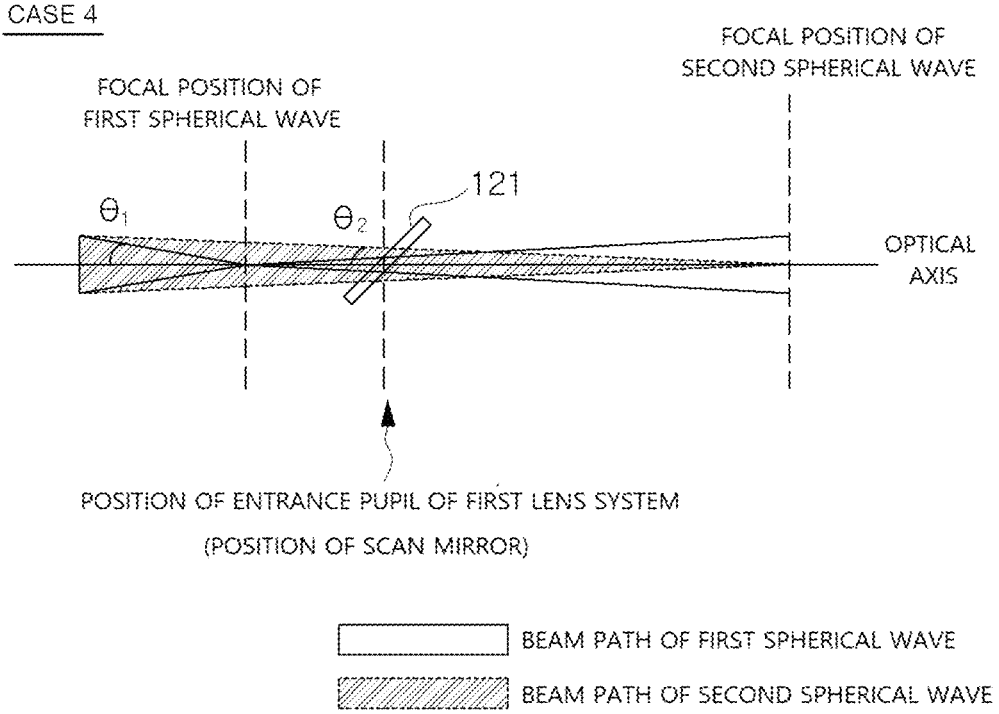

[FIG. 10]
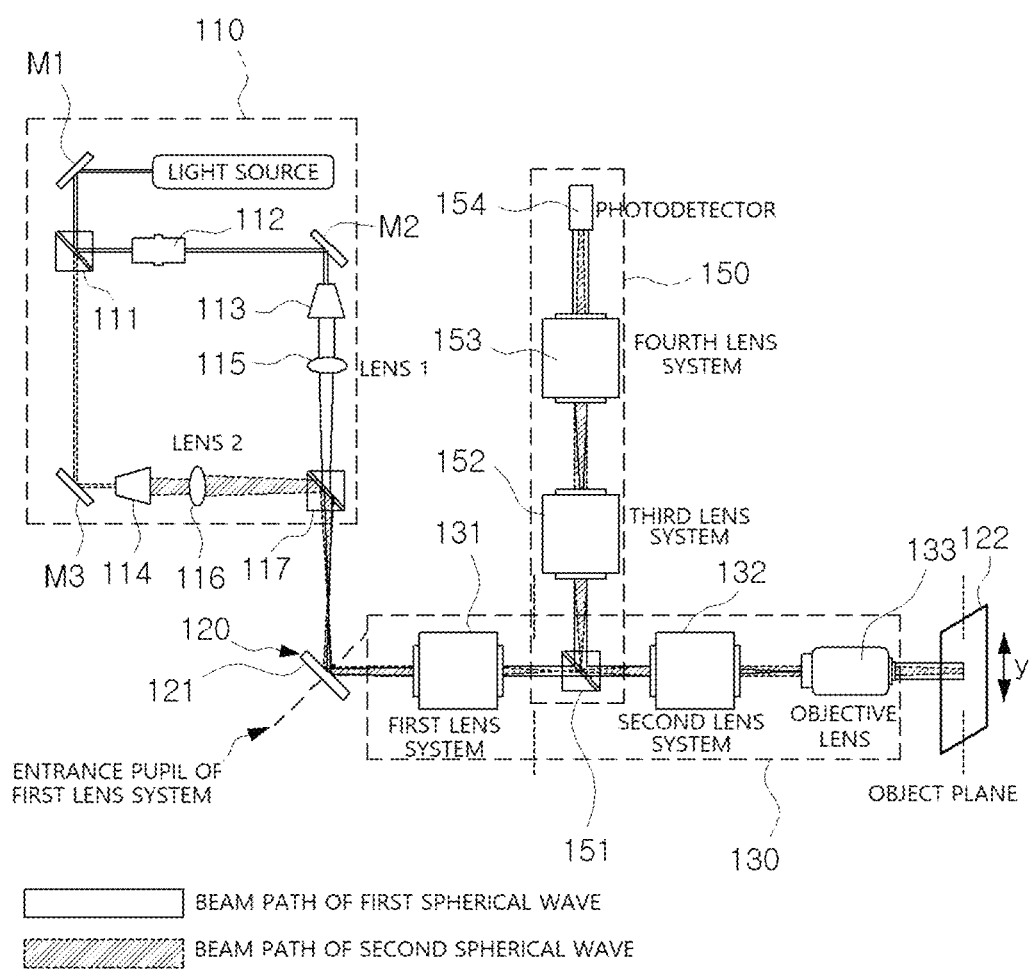

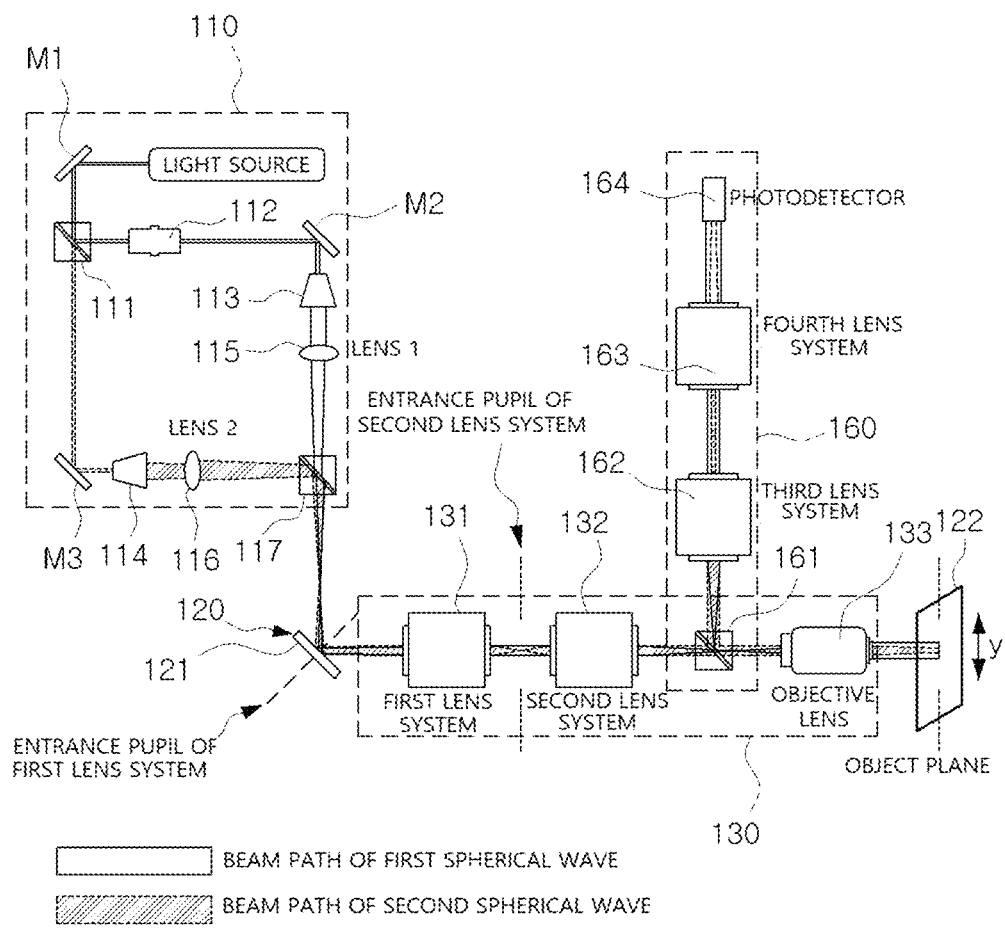
[FIG. 11]

[FIG. 12]
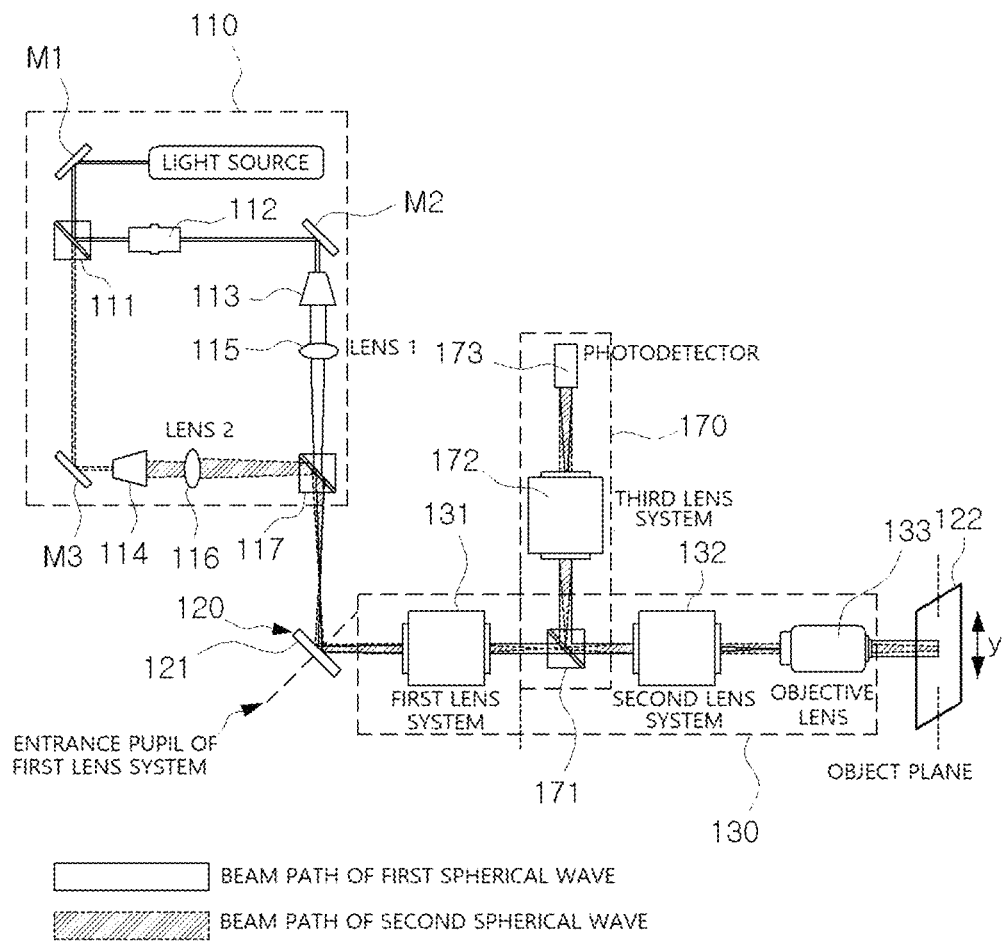

FLYING-OVER BEAM PATTERN SCANNING HOLOGRAM MICROSCOPE DEVICE USING SPATIAL MODULATION SCANNER AND TRANSLATION STAGE

TECHNICAL FIELD

The present invention relates to a flying-over beam pattern scanning hologram microscope device using a spatial modulation scanner and a translation stage, and more particularly, to a flying-over beam pattern scanning hologram microscope device capable of realizing a high-resolution scanning hologram microscope at a high speed.

BACKGROUND ART

A conventional optical scanning hologram microscope scans an object by forming a beam pattern with a spatial distribution of a Fresnel zone plate by using an interferometer, forming the formed beam pattern into a high-resolution Fresnel zone pattern on an object plane through a objective lens, projecting the beam pattern onto an object, and moving an object plate, on which the object is placed, by a mechanical method. A hologram of the object is acquired by condensing a beam, which fluoresces or is reflected from the object, on a Fourier plane of a light collecting lens.

However, in such a conventional method, since the object plate is mechanically moved, the hologram acquisition speed is slow and it is difficult to acquire a hologram of a fluid such as a living body.

The technology that is the background of the present invention is disclosed in Korean Patent Registration No. 1304695 (registered on Sep. 6, 2013).

DISCLOSURE

Technical Problem

The present invention is directed to provide a flying-over beam pattern scanning hologram microscope device using a spatial modulation scanner and a translation stage, capable of realizing a high-resolution scanning hologram microscope at high speed.

Technical Solution

The present invention provides a flying-over beam pattern scanning hologram microscope device including a scan beam generation unit which modulates a phase of a first beam split from a light source to convert the first beam to a first spherical wave through a first lens, converts a second beam to a second spherical wave through a second lens, and then allows the first and second spherical waves to interfere with each other to form a scan beam, a scanning unit which comprises a spatial modulation scanner for controlling the incident scan beam in a horizontal direction to be transferred to a projection unit, so as to control a scanning position of the scan beam for an object in horizontal and vertical directions, and a translation stage for moving the object in the vertical direction at a rear end of the projection unit, the projection unit which comprises multiple systems and an objective lens and projects the scan beam transferred from the scanning unit onto an object plane on which the object is placed, and a light collection unit which detects a beam that has passed through the objective lens again after fluorescing or being reflected from an object, wherein the scan beam projected onto the object plane has different patterns according to focal position and conical angle conditions of each of the first and second spherical waves formed on the spatial modulation scanner.

In addition, The spatial modulation scanner may be one selected from among a spatial light modulator (SLM), a digital micromirror device (DMD), and an acousto-optic deflector, and when a scanning control signal is input, an interval between grating patterns may be gradually changed over time to control the scan beam in the vertical or horizontal direction.

In addition, the scan beam projected onto the object plane may be determined as one of an interference structure (first pattern) between a converging spherical wave and a plane wave on the object plane according to focal position and conical angle conditions of each of the first and second spherical waves formed on the spatial modulation scanner, an interference structure (second pattern) between a diverging spherical wave and a plane wave on the object plane, an interference structure (third pattern) between two diverging spherical waves on the object plane, and an Interference structure (fourth pattern) between a converging spherical wave and a diverging spherical wave on the object plane.

In addition, The projection unit may comprise a first lens system, a second lens system, and the objective lens sequentially disposed between the scanning unit and the object plane, and an entrance pupil of the first lens system may be located in the spatial modulation scanner.

In addition, when the, the first and second spherical waves may become a plane wave and a converging spherical wave with respect to the object plane, respectively, so that the scan beam projected onto the object plane has an interference structure between the converging spherical wave and the plane wave on the object plane, and the first condition may be a condition that a focal position of the first spherical wave is the same as a position of the entrance pupil of the first lens system, a focal position of the second spherical wave is the same as the position of the entrance pupil of the first lens system or in front of the entrance pupil of the first lens system, and conical angles ($\theta_1$, $\theta_2$) of the first and second spherical waves satisfy $\theta_2 \leq \theta_1$.

In addition, when the condition is a second condition, the first and second spherical waves may become a plane wave and a diverging spherical wave with respect to the object plane, respectively, so that the scan beam projected onto the object plane has an interference structure between the diverging spherical wave and the plane wave on the object plane, and the second condition may be a condition that a focal position of the first spherical wave is the same as a position of the entrance pupil of the first lens system, a focal position of the second spherical wave is the same as the position of the entrance pupil of the first lens system or behind the entrance pupil of the first lens system, and conical angles ($\theta_1$, $\theta_2$) of the first and second spherical waves satisfy $\theta_2 \leq \theta_1 \leq 2\theta_2$.

In addition, when the condition is a third condition, both the first and second spherical waves may become diverging spherical waves with respect to the object plane, so that the scan beam projected onto the object plane has an interference structure between the two diverging spherical waves on the object plane, and the third condition may be a condition that a focal position of the first spherical wave is behind the entrance pupil of the first lens system, a focal position of the second spherical wave is behind the focal position of the first spherical wave, and conical angles ($\theta_1$, $\theta_2$) of the first and second spherical waves satisfy $\theta_2 \leq \theta_1$.

In addition, when the condition is a fourth condition, the first and second spherical waves may become a converging spherical wave and a diverging spherical wave with respect to the object plane, respectively, so that the scan beam projected onto the object plane has an interference structure between the converging spherical wave and the diverging spherical wave on the object surface, and the fourth condition may be a condition that a focal position of the first spherical wave is in front of the entrance pupil of the first lens system, a focal position of the second spherical wave is behind the entrance pupil of the first lens system, and conical angles ($\theta_1$, $\theta_2$) of the first and second spherical waves satisfy $\theta_2 < \theta_1$.

$$|\theta_2 - \theta_1| < \frac{1}{2}|\theta_2 + \theta_1|$$

In addition, in response to the first condition, the first lens system may transfer the received scan beam to the second lens system, and the first and second lens systems may satisfy conditions of Equation below.

$|\theta_1 + \theta_s| \leq |\theta_1^r|$, $|\theta_2 + \theta_s| \leq |\theta_1^r|$ $|r_{sph1}| \leq |f_1 \alpha_1^r|$ $|r_{sph2}| \leq |f_1 \alpha_1^r|$ wherein, $\theta_1$ and $\theta_2$ represent the conical angles (convergence half-angles) of the first and second spherical waves, $\theta_S$ represents a scan angle at the spatial modulation scanner of the scanning unit, $\theta_1^r$ represents an acceptance angle of the first lens system, $f_1$ represents an effective focal length of the first lens system, $\alpha_1^r$ represents a convergence angle of a front focal plane of the first lens system, and $r_{sph1}$ and $r_{sph2}$ represent radii of the first and second spherical waves on an entrance pupil plane of the first lens system.

In addition, in response to the second condition, the first lens system may transfer the received scan beam to the second lens system, and the first and second lens systems may satisfy conditions of Equation below.

$|\theta_1 + \theta_s| \leq |\theta_1^r|$, $|\theta_2 + \theta_s| \leq |\theta_1^r|$ $|r_{sph1}| \leq |f_1 \alpha_1^r|$ $|r_{sph2}| \leq |f_1 \alpha_1^r|$ wherein, $\theta_1$ and $\theta_2$ represent the conical angles (convergence half-angles) of the first and second spherical waves, $\theta_S$ represents a scan angle at the spatial modulation scanner of the scanning unit, $\theta_1^r$ represents an acceptance angle of the first lens system, $f_1$ represents an effective focal length of the first lens system, $\alpha_1^r$ represents a convergence angle of a front focal plane of the first lens system, and $r_{sph1}$ and $r_{sph2}$ represent radii of the first and second spherical waves on an entrance pupil plane of the first lens system.

In addition, in response to the third condition, the first lens system may transfer the received scan beam to the second lens system, and the first and second lens systems may satisfy conditions of Equation below.

$|\theta_1 + \theta_s| \leq |\theta_1^r|$, $|\theta_2 + \theta_s| \leq |\theta_1^r|$ $|r_{sph1}| \leq |f_1 \alpha_1^r|$ $|r_{sph2}| \leq |f_1 \alpha_1^r|$, wherein, $\theta_1$ and $\theta_2$ represent the conical angles (convergence half-angles) of the first and second spherical waves, $\theta_S$ represents a scan angle at the spatial modulation scanner of the scanning unit, $\theta_1^r$ represents an acceptance angle of the first lens system, $f_1$ represents an effective focal length of the first lens system, $\alpha_1^r$ represents a convergence angle of a front focal plane of the first lens system, and $r_{sph1}$ and $r_{sph2}$ represent radii of the first and second spherical waves on an entrance pupil plane of the first lens system.

In addition, in response to the fourth condition, the first lens system may transfer the received scan beam to the second lens system, and the first and second lens systems may satisfy conditions of Equation below.

$|\theta_s - \theta_1| \leq |\theta_1^r|$, $\theta_2 + \theta_s \leq \theta_1^r$ $r_{sph1} \leq f_1 \alpha_1^r$ $r_{sph2} \leq f_1 \alpha_1^r$ wherein, $\theta_1$ and $\theta_2$ represent the conical angles (convergence half-angles) of the first and second spherical waves, $\theta_S$ represents a scan angle at the spatial modulation scanner of the scanning unit, $\theta_1^r$ represents an acceptance angle of the first lens system, $f_1$ represents an effective focal length of the first lens system, $\alpha_1^r$ represents a convergence angle of a front focal plane of the first lens system, and $r_{sph1}$ and $r_{sph2}$ represent radii of the first and second spherical waves on an entrance pupil plane of the first lens system.

In addition, in response to the first condition, both of a radius of the plane wave on the object plane corresponding to the first spherical wave and a radius of the converging spherical wave on the object plane corresponding to the second spherical wave may be smaller than or equal to a radius of field of view of the objective lens as shown in Equation below.

$$\left|(\theta_1 + \theta_s)\frac{f_0 f_1}{f_2}\right| \leq |F_{obj}|, \left|(\theta_2 + \theta_s)\frac{f_0 f_1}{f_2}\right| \leq |F_{obj}|,$$

wherein $\theta_1$ and $\theta_2$ represent the conical angles (half-convergence angles) of the first and second spherical waves, $\theta_S$ represents a scan angle at the spatial modulation scanner of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

In addition, in response to the second condition, both of a radius of the plane wave on the object plane corresponding to the first spherical wave and a radius of the diverging spherical wave on the object plane corresponding to the second spherical wave may be smaller than or equal to a radius of field of view of the objective lens as shown in Equation below.

$$\left|(\theta_1 + \theta_s)\frac{f_0 f_1}{f_2}\right| \leq |F_{obj}|, \left|(\theta_2 + \theta_s)\frac{f_0 f_1}{f_2}\right| \leq |F_{obj}|$$

wherein $\theta_1$ and $\theta_2$ represent the conical angles (half-convergence angles) of the first and second spherical waves, $\theta_S$ represents a scan angle at the spatial modulation scanner of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

In addition, in response to the third condition, both of a radius of the diverging spherical wave on the object plane corresponding to the first spherical wave and a radius of the diverging spherical wave on the object plane corresponding to the second spherical wave may be smaller than or equal to a radius of field of view of the objective lens as shown in Equation below.

$$\left|(\theta_1+\theta_s)\frac{f_0 f_1}{f_2}\right| \le |F_{obj}|, \left|(\theta_2+\theta_s)\frac{f_0 f_1}{f_2}\right| \le |F_{obj}|,$$

wherein $\theta_1$ and $\theta_2$ represent the conical angles (half-convergence angles) of the first and second spherical waves, $\theta_S$ represents a scan angle at the spatial modulation scanner of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

In addition, in response to the fourth condition, both of a radius of the converging spherical wave on the object plane corresponding to the first spherical wave and a radius of the diverging spherical wave on the object plane corresponding to the second spherical wave are smaller than or equal to a radius of field of view of the objective lens as shown in Equation below.

$$\left|(\theta_1-\theta_s)\frac{f_0 f_1}{f_2}\right| \le |F_{obj}|, \left|(\theta_2+\theta_s)\frac{f_0 f_1}{f_2}\right| \le |F_{obj}|,$$

wherein $\theta_1$ and $\theta_2$ represent the conical angles (half-convergence angles) of the first and second spherical waves, $\theta_S$ represents a scan angle at the spatial modulation scanner of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

In addition, optical invariance of the first and second lens systems may be greater than or equal to optical invariance of the objective lens as in Equations below.

$$I_1 \ge I_{obj}, I_2 \ge I_{obj}$$

Here, $I_1$, $I_2$, and $I_{obj}$ denote the optical invariance of the first lens system, the second lens system, and the objective lens, respectively.

In addition, the light collection unit may include: a optical splitter which is disposed between the second lens system and the objective lens, and which transfers the beam passing through the second lens system to the objective lens, and reflects the beam reflected from the object and passing through the objective lens to the outside; a third lens system which receives the beam reflected by the optical splitter; and a photodetector which detects a beam passing through the third lens system, wherein a size of a detection plane of the photodetector satisfies Equation below:

$$\left|\frac{\theta_s f_1 f_3}{f_2}\right| \le |F_{pd}| \text{ or } \left|\frac{F_0 f_3}{f_0}\right| \le |F_{pd}|$$

wherein $F_{pd}$ represents the size of the detection plane, $\theta_S$ represents a scan angle at the spatial modulation scanner of the scanning unit, $f_1$ to $f_3$ represent effective focal lengths of the first to third systems, $f_0$ represents an effective focal length of the objective lens, and $F_o$ represents a radius of a field of view in a front focal plane of the objective lens.

In addition, the light collection unit may include: a optical splitter which is disposed between the first lens system and the second lens system, and which transfers the beam passing through the first lens system to the second lens system, and reflects the beam reflected from the object and passing the second lens system through the objective lens to the outside; a third lens system which receives the beam reflected by the optical splitter; a fourth lens system which receives the beam passing through the third lens system; and a photodetector which detects a beam passing through the fourth lens system, wherein a size of a detection plane of the photodetector satisfies Equation below.

$$\left|\frac{\theta_s f_1 f_4}{f_3}\right| \le |F_{pd}| \text{ or } \left|\frac{F_0 f_2 f_4}{f_0 f_3}\right| \le |F_{pd}|$$

wherein $F_{pd}$ represents the size of the detection plane, $\theta_S$ represents a scan angle at the spatial modulation scanner of the scanning unit, $f_1$ to $f_4$ represent effective focal lengths of the first to fourth systems, $f_0$ represents an effective focal length of the objective lens, and $F_o$ represents a radius of a field of view in a front focal plane of the objective lens.

In addition, the light collection unit may include: a optical splitter which is disposed between the second lens system and the objective lens, and which transfers the beam passing through the second lens system to the objective lens, and reflects the beam reflected from the object and passing the objective lens to the outside; a third lens system which receives the beam reflected by the optical splitter; a fourth lens system which receives the beam passing through the third lens system; and a photodetector which detects a beam passing through the fourth lens system, wherein a spatial frequency-converted light distribution of an image on the object plane of the objective lens is generated on a detection plane of the photodetector, and a size of the detection plane of the photodetector satisfies Equation below.

$$|0.1 f_4 NA_{\text{eff}}| \le |F_{pd}|,$$

wherein $F_{pd}$ represents the size of the detection plane of the photodetector, $f_4$ represents an effective focal length of the fourth lens system, and $NA_{\text{eff}}$ represents an effective numerical aperture of the beam transferred to the object plane and is defined as a difference ($NA_{\text{eff}}=|NA_1-NA_2|$) between a numerical aperture ($NA_1$) of the first spherical wave and a numerical aperture ($NA_2$) of the second spherical wave, the first spherical wave and the second spherical wave being transferred to the object plane.

In addition, the light collection unit may include: a optical splitter which is disposed between the first lens system and the second lens system, and which transfers the beam passing through the first lens system to the second lens system, and reflects the beam reflected from the object and passing the second lens system through the objective lens to the outside; a third lens system which receives the beam reflected by the optical splitter; and a photodetector which detects a beam passing through the third lens system, wherein a spatial frequency-converted light distribution of an image on the object plane of the objective lens is generated on a detection plane of the photodetector, and a size of the detection plane of the photodetector satisfies Equation below.

$$|0.1f_3 NA_{eff}| \leq |F_{pd}|$$

wherein $F_{pd}$ represents the size of the detection plane of the photodetector, $f_3$ represents an effective focal length of the third lens system, and $NA_{eff}$ represents an effective numerical aperture of the beam transferred to the object plane and is defined as a difference ($NA_{eff}=|NA_1-NA_2|$) between a numerical aperture ($NA_1$) of the first spherical wave and a numerical aperture ($NA_2$) of the second spherical wave, the first spherical wave and the second spherical wave being transferred to the object plane.

Advantageous Effects

According to the present invention, a high-resolution Fresnel zone pattern is formed as a scanning beam pattern on an objective surface through an objective lens, and a beam reflected from an object is imaged to a detection plane of a photodetector through the objective lens while performing a flying-over scan in which the pattern flies over the object, thereby implementing a high-resolution scanning hologram microscope at high speed.

DESCRIPTION OF DRAWINGS

FIG. 1A is a diagram illustrating a flying-over beam pattern scanning hologram microscope device according to a first embodiment of the present invention.

FIG. 1B is a diagram for describing an operation principle of a spatial modulation scanner according to an embodiment of the present invention.

FIG. 2 is a diagram illustrating first and second spherical wave generation conditions of a scan beam generation unit for forming an interference structure on an object plane according to CASE 1 of FIG. 1A.

FIGS. 3A and 3B show diagrams illustrating that lens systems are modeled as a general optical system and an aplanatic optical system, respectively.

FIG. 4 is a diagram illustrating a flying-over beam pattern scanning hologram microscope device according to a second embodiment of the present invention.

FIG. 5 is a diagram illustrating first and second spherical wave generation conditions of a scan beam generation unit for forming an interference structure on an object plane according to CASE 2 of FIG. 4.

FIG. 6 is a diagram illustrating a flying-over beam pattern scanning hologram microscope device according to a third embodiment of the present invention.

FIG. 7 is a diagram illustrating first and second spherical wave generation conditions of a scan beam generation unit for forming an interference structure on an object plane according to CASE 3 of FIG. 6.

FIG. 8 is a diagram illustrating a flying-over beam pattern scanning hologram microscope device according to a fourth embodiment of the present invention.

FIG. 9 is a diagram illustrating first and second spherical wave generation conditions of a scan beam generation unit for forming an interference structure on an object plane according to CASE 4 of FIG. 8.

FIGS. 10 to 12 are diagrams illustrating modified examples of a light collection unit shown in FIG. 1A.

BEST MODE

Hereinafter, embodiments of the present invention will be described in detail with reference to the accompanying drawings, so that those of ordinary skill in the art to which the present invention belongs may easily carry out the present invention. However, the present invention may be implemented in various different forms and is not limited to the embodiments described herein. In order to clearly explain the present invention, parts irrelevant to the description are omitted in the drawings, and similar reference numerals are assigned to similar parts throughout the specification.

It will be understood that when a portion is referred to as being "connected to" another portion, it may be "directly connected to" the other portion or "electrically connected to" the other portion with intervening portions therebetween. It will be understood that the terms "comprise," "include," or "have" as used herein specify the presence of stated elements, but do not preclude the presence or addition of one or more other elements.

Hereinafter, embodiments of the present invention will be described in detail with reference to the accompanying drawings, so that those of ordinary skill in the art to which the present invention belongs may easily carry out the present invention. However, the present invention may be implemented in various different forms and is not limited to the embodiments described herein. In order to clearly explain the present invention, parts irrelevant to the description are omitted in the drawings, and similar reference numerals are assigned to similar parts throughout the specification.

It will be understood that when a portion is referred to as being "connected to" another portion, it may be "directly connected to" the other portion or "electrically connected to" the other portion with intervening portions therebetween. It will be understood that the terms "comprise," "include," or "have" as used herein specify the presence of stated elements, but do not preclude the presence or addition of one or more other elements.

The present invention relates to a flying-over beam pattern scanning hologram microscope device and provides an optical system structure in which a beam generated by a scan beam generation unit is projected onto an object to be scanned, and light reflected or fluoresced from the object is collected and transmitted to a photodetector.

According to the present invention, a high-resolution Fresnel zone pattern is formed as a scanning beam pattern on an object plane through an objective lens, the pattern performs a flying-over scan in which the pattern flies over the object, a beam reflected or fluoresced again from the object onto which the scanning beam pattern is irradiated is imaged on a detection plane of a photodetector through the objective lens, thereby forming an image of the object to be scanned, and the intensity of light of the image on the detection plane of the photodetector is spatially condensed.

The present invention largely includes first to fourth embodiments CASE 1 to CASE 4, and the respective embodiments are classified according to the shape of the beam entering the object plane (the plane on which the object is placed).

In the first and second embodiments CASE 1 and CASE 2, a spherical wave and a plane wave interfere with each other and enter an object plane. However, in the first embodiment, a scan beam formed of a converging spherical wave and a plane wave is applied to the object plane, and in the second embodiment, a scan beam formed of a diverging spherical wave and a plane wave is applied to the object plane.

In the third and fourth embodiments (CASE 3 and CASE 4), a spherical wave and a spherical wave interfere with each other and enter an object plane. However, in the third embodiment, a scan beam formed by the two diverging spherical waves is applied to the object plane, and in the fourth embodiment, a scan beam formed by a converging spherical wave and a diverging spherical wave is applied to the object plane. These four embodiments may be determined differently according to first and second spherical wave generation conditions in the scan beam generation unit.

Hereinafter, a flying-over beam pattern scanning hologram microscope device according to embodiments of the present invention will be described in more detail through the drawings.

FIG. 1A is a diagram illustrating a flying-over beam pattern scanning hologram microscope device according to a first embodiment of the present invention.

As shown in FIG. 1A, a flying-over beam pattern scanning hologram microscope device 100 according to the first embodiment of the present invention mainly includes a scan beam generation unit 110, a scanning unit 120, a projection unit 130, and a light collection unit 140. Such a basic structure is also applied to the remaining second to fourth embodiments.

First, the scan beam generation unit 110 shifts a frequency of a first beam among first and second beams divided from a light source and converts the first beam into a first spherical wave through a first lens 115, converts the second beam into a second spherical wave through a second lens 116, and allows the first and second spherical waves to interfere with each other to form a scan beam.

The scan beam generation unit 110 uses a Mach-Zender interferometer structure that generates the first and second spherical waves by splitting the light source into the first and second beams and then combines the two generated beams again.

The scan beam generation unit 110 includes a light source, a first mirror M1, a first optical splitter 111, a frequency shifting unit 112, second and third mirrors M2 and M3, first and second beam expanders 113 and 114, first and second lenses 115 and 116, and an interference means 117.

The light source is a part that generates electromagnetic waves. The light source may include various means such as a laser generator capable of generating electromagnetic waves, a light emitting diode (LED), and a mean for generating a low coherence beam such as halogen light having a short coherence length. Hereinafter, a representative example in which a light source is implemented as a laser generator will be described.

The beam output from the light source is transmitted to the first mirror M1, reflected, and then input to the first optical splitter 111.

The first optical splitter 111 splits an incident beam into the first beam and the second beam, transmits the first beam to a phase modulation means 112 (acousto-optic modulator), and transmits the second beam to the third mirror M3. That is, the beam following the path of the first beam in the first optical splitter 111 is transferred to the phase modulation means 112, and the beam following the path of the second beam is transferred to the third mirror M3.

Here, the first optical splitter 111 may include an optical fiber coupler, a beam splitter, a geometric phase lens, and the like and may be implemented in a way of transmitting form which guides a beam to a free space and transmits the beam to the outside. Here, when a means capable of splitting a beam in-line, such as a geometric phase lens, a beam may be split into the first beam and the second beam in-line. Hereinafter, it is assumed that each optical splitter is implemented as a beam splitter.

The phase modulator 112 frequency-shifts the first beam and transfers the frequency-shifted first beam to the second mirror M2. The phase modulation unit 112 may shift the frequency of the first beam by $\Omega$ by using a frequency generated by a function generator (not illustrated) and transfers the frequency-shifted first beam to the second mirror M2. Here, the phase modulation means 112 may be implemented as various types of modulators that modulate the phase of light according to electrical signals, including an acousto-optic modulator and an electro-optic modulator.

The first beam reflected by the second mirror M2 is expanded by the first beam expander 113 and then transferred to the first lens 115. The second beam reflected from the third mirror M3 is expanded by the second beam expander 114 and then transfers to the second lens 116. The beam expander may be implemented as a collimator.

The first lens 115 is located between the first beam expander 113 and the interference means 117, converts the expanded first beam into the first spherical wave, and transfers the first spherical wave to the interference means 117. That is, the first lens 115 modulates a spatial distribution of the first beam to generate the first spherical wave from the first beam.

The second lens 116 is located between the second beam expander 114 and the interference means 117, converts the expanded second beam into the second spherical wave, and transfers the second spherical wave to the interference means 117. That is, the second lens 116 modulates a spatial distribution of the second beam to generate the second spherical wave from the second beam.

The generated first and second spherical waves interfere with each other while passing through the interference means 117, and are transferred to the scanning unit 120. The interference means 117 may be implemented as a beam splitter.

The interference means 117 overlaps and interferes the first beam (first spherical wave) passing through the first lens 115 and the second beam (second spherical wave) passing through the second lens 116, and forms a scan beam having a Fresnel zone pattern as an interference pattern.

As described above, the scan beam generation unit 110 converts the first and second beams split from the light source into the first and second spherical waves, overlaps the first and second spherical waves through the interference means 117 to form the scan beam, and transfers the formed scan beam to the scanning unit 120.

Next, a configuration of the scanning unit shown in FIG. 1A will be described in more detail.

An interference pattern (scan beam) generated between the first and the second spherical waves generated by the scan beam generation unit 110 is incident on the scanning unit 120. A beam incident on the scanning unit 120 is transferred to a first lens system 131 of the projection unit 130 through a spatial modulation scanner 121.

In order to control a scanning position of a scan beam with respect to an object in horizontal and vertical directions, the scanning unit 120 includes the spatial modulation scanner 121 installed at a rear end portion of the scan beam generation unit 110 to scan the object in an x direction and a translation stage 122 installed at a rear end portion of the projection unit 130 to scan the object in a y direction.

The spatial modulation scanner 121 controls a scan beam incident from the scan beam generation unit 110 in the horizontal direction and transfers the scan beam to the projection unit 130. The translation stage 122 directly moves an object, on which a scan beam is incident, in the vertical direction at the rear end portion of the projection unit 130 to enable a y direction scan on the object through the scan beam.

The translation stage 122 is implemented as an objective plate, on which an object is placed, movable in a y-axis direction, and corresponds to a moving objective plate. Although the translation stage 122 is physically separated from the spatial modulation scanner 121, the translation stage 122 corresponds to a means for controlling a scanning position of a beam with respect to an object and thus is included as a component of the scanning unit 120 together with the spatial modulation scanner 121.

As described above, the scanning unit 120 controls a scan beam in the horizontal direction (x direction) and the vertical direction (y direction) with respect to an object using the spatial modulation scanner 121 and the translation stage 122.

In this case, the spatial modulation scanner 121 modulates a spatial distribution of an incident beam to perform a scan in a specific direction using the beam.

The spatial modulation scanner may be implemented as a spatial light modulator (SLM), a digital micromirror device (DMD), an acousto-optic deflector, or the like. Accordingly, the scanning unit 120 includes any one type of spatial modulation scanner selected from among the SLM, the DMD, and the acousto-optic deflector.

In the embodiment of the present invention, although the spatial modulation scanner is exemplified as a horizontal scanning means, but the present invention is not necessarily limited to the spatial modulation scanner, and a means similar thereto or other known scanning means may be used.

FIG. 1B is a diagram for describing an operation principle of the spatial modulation scanner according to the embodiment of the present invention.

In the embodiment of the present invention, the spatial modulation scanner 121 corresponds to a horizontal spatial modulation scanner that scans an object in the x direction, and in FIG. 1B, a principle of such a horizontal spatial modulation scanner is described.

As shown in FIG. 1B, in the spatial modulation scanner, when a scanning control signal is input by a scan controller (not shown), an interval between grating patterns P is gradually changed over time to control a scan beam in the vertical or horizontal direction.

That is, as the interval between the grating patterns formed in the horizontal spatial modulation scanner is adjusted over time by the electrical signal, an incident beam may move in the x direction. In general, as an interval between patterns becomes narrower, light is bent at a greater angle.

Thus, in the case of the horizontal spatial modulation scanner, a magnitude of the interval between the grating patterns P formed in the horizontal direction is adjusted according to the scanning control signal, thereby moving a scan beam in the horizontal direction. As described above, in the case of the spatial modulation scanner, a direction of an incident beam is electrically controlled.

The scanning unit 120 operates by receiving a scanning control signal from the scan controller (not shown) in an electronic processing unit (not shown). The scan controller (not shown) generates a scanning control signal for controlling a scanning position of the scanning unit 120.

Here, a scanning control signal for the spatial modulation scanner 121 may include a signal for gradually changing the magnitude of the interval between the grating pattern over time. Also, a scanning control signal for the translation stage 122 may include a signal for moving the translation stage 122 in the vertical direction over time.

Also, the scanning control signal may include a horizontal scan signal and a vertical scan signal for controlling a scan beam in the horizontal and vertical directions, respectively.

The horizontal scan signal for controlling a scan beam incident on the spatial modulation scanner 121 in the horizontal direction is a signal for gradually moving a scanning position in the horizontal direction (x-axis direction) in a preset distance unit and has a period T for scan movement in an arbitrary distance unit. The vertical scan signal, which is a signal for moving the translation stage 122 in the vertical direction, is a translation stage control signal that enables a horizontal scan operation for a next y position when a horizontal scan operation in the x-axis direction for an arbitrary y position is completed, and has a period that is greater than that of the horizontal scan signal.

As the spatial modulation scanner 121 is controlled in response to the scanning control signal, optical axes of the first spherical wave and the second spherical wave are rotated, and a scan beam pattern of which an optical axis is rotated is transferred to the first lens system 131 of the projection unit 130.

Here, a half-angle between a non-rotated reference optical axis and a rotated optical axis is referred to as a scan angle $\theta_S$. For example, the half-angle may refer to a scan angle of a beam controlled by the spatial modulation scanner 121 in a state in which a plane of the spatial modulation scanner 121 faces a z-axis direction.

By using the spatial modulation scanner 121, the scanning unit 120 transmits an interference beam (scan beam) between the first spherical wave and the second spherical wave to the projection unit 130 and inputs the interference beam to the first lens system 131.

The projection unit 130 includes the first lens system 131, a second lens system 132, and an objective lens 133 sequentially disposed between the scanning unit 120 and an object plane and projects the scan beam received from the spatial modulation scanner 121 of the scanning unit 120 onto the object plane on which an object is positioned.

The projection unit 130 forms a high-resolution Fresnel zone pattern on the object plane as a scanning beam pattern through the objective lens 133 to perform a flying-over scan in which a pattern flies over an object.

The light collection unit 140 detects the beam that has passes through the objective lens 133 again after fluorescing or being reflected from the object irradiated with the scan beam. At this time, the light collection unit 140 includes a third lens system 142 and a photodetector 143. The light collection unit 140 forms an image of the object by imaging the beam reflected from the object onto the detection plane of the photodetector 143 through the objective lens 133, and spatially integrates and collecting the light intensity of the image imaged onto the detection plane. Here, of course, the detection plane may be located not only on the focal plane of the imaged image but also on the defocused plane of the imaged image.

The light collection unit 140 may collect and detect light intensity on the detection plane of the photodetector 143 by generating an electrical signal proportional to a total amount of light. A structure of the light collection unit 140 may be diverse according to embodiments. As shown in FIG. 1A, the light collection unit 140 may be configured by including a second optical splitter 141 disposed between the second lens system 132 and the objective lens 133, and a third lens system 142 and a photodetector 143 disposed behind the third lens system 142.

A beam reflected or fluoresced from an object enters the second optical splitter 141 through the objective lens 133, and the beam is reflected through the second optical splitter 141 and transferred to the third lens system 142 and the photodetector 143 at an upper end portion.

More various structures of the light collection unit 140 will be described below. In addition, various structures of the light collection unit can be applied to all of the first to fourth embodiments.

Hereinafter, the first to fourth embodiments of the present invention will be described in detail with reference to FIGS. 1A, 4, 6, and 8.

In the embodiment of the present invention, a scan beam pattern projected onto the object plane is different according to a focal position and conical angle condition of each of the first and second spherical waves formed on the spatial modulation scanner 121, and the present invention is divided into the first to fourth embodiments.

Conditions for generating the first and second spherical waves formed on the spatial modulation scanner 121 are different for each of the first to fourth embodiments (see FIGS. 2, 5, 7, and 9), and accordingly, a shape of a beam actually entering the object plane is also changed (see FIGS. 1A, 4, 6, and 8).

In the case of the first embodiment of FIG. 1A, a converging spherical wave and a plane wave enter the object plane, in the second embodiment of FIG. 4, a diverging spherical wave and a plane wave enter the object plane, in the third embodiment of FIG. 6, two diverging spherical waves enter the object plane, and in the fourth embodiment of FIG. 8, a converging spherical wave and a diverging spherical wave enter the object plane.

Therefore, in the embodiment of the present invention, it can be seen that a pattern of a scan beam projected onto the object plane is determined in one of four interference structures according to a focal position and conical angle condition of each of the first and second spherical waves formed on the spatial modulation scanner 121.

Specifically, a first interference structure projected onto the object plane is an interference structure (first pattern; CASE 1A in FIG. 1) between the converging spherical wave and the plane wave with respect to the object plane, and a second interference structure is an interference structure between the diverging spherical wave and the plane wave (second pattern; CASE 2 in FIG. 4). In addition, a third interference structure is an interference structure between two diverging spherical waves (third pattern; CASE 3 in FIG. 6), and a fourth interference structure is an interference structure between the converging spherical wave and the diverging spherical wave (fourth pattern; see CASE 4 in FIG. 8).

Next, spherical wave generation conditions of the scan beam generation unit 110 for each of CASE 1 to CASE 4 will be described in detail.

[CASE 1] Interference Pattern Between Converging Spherical Wave and Plane Wave

FIG. 2 is a diagram illustrating first and second spherical wave generation conditions of the scan beam generation unit for forming an interference structure on the object plane according to CASE 1 of FIG. 1A.

In the first embodiment (CASE 1), the first and second spherical waves become the plane wave and the converging spherical wave with respect to the object plane, respectively, and the scan beam projected onto the object plane has an interference structure between the converging spherical wave and the plane wave on the object plane.

As described above, in the case of CASE 1, the structure in which the pattern of the interference beam of the converging spherical wave and the plane wave with respect to the object plane is used as the scan beam pattern for object scanning has a resolution equal to or lower than that of the objective lens, but the depth region in which the object can be located on the object plane is increased.

To this end, the scan beam generation unit 110 generates the first spherical wave and the second spherical wave under a focal length and conical angle condition shown in FIG. 2.

Referring to FIG. 2, in CASE 1, the focal position of the first spherical wave is the same as the position of the entrance pupil of the first lens system 131, and the focal position of the second spherical wave is the same as the position of the entrance pupil of the first lens system 131 or located at the front end of the first lens system 131. In addition, at the same time, CASE 1 has the condition that the conical angle $\theta_1$ of the first spherical wave is equal to or greater than the conical angle $\theta_2$ of the second spherical wave as follows.

$$\theta_1 \geq \theta_2 \quad \text{[Equation 1]}$$

Here, of course, the focal position and the conical angle of each of the first and second spherical waves may be determined according to a specification such as a focal length of each of the first and second lenses 115 and 116 included in the scan beam generation unit 110.

The projection unit 130 transfers the first spherical wave and the second spherical wave, whose optical axes are rotated, received from the scanning unit 120 to the objective lens 133, and the objective lens 133 transfers the received first and second spherical waves to the objective plane of the objective lens 133.

In this case, the entrance pupil of the first lens system 131 is positioned on a scan plane of the spatial modulation scanner 121.

The scan beam by the two spherical waves is transmitted to the first lens system 131 through the spatial modulation scanner 121 of the scanning unit 120. The first lens system 131 transfers the received scan beam to the second lens system 132. Here, it is preferable that an entrance pupil of the second lens system 132 is positioned at the same position as an exit pupil of the first lens system 131. The second lens system 132 transmits the scan beam to the objective lens 133. The objective lens 133 projects the received scan beam onto the object plane. In this case, it is preferable that a position of an entrance pupil of the objective lens 133 is positioned at the same position as an exit pupil of the second lens system 132.

The first beam converted into a plane wave by the first and second lens systems 131 and 132 having the above-described structure and a second beam converted into a converging spherical wave by the first and second lens systems 131 and 132 overlap each other on the object plane on which an object is positioned. In this case, according to scanning of the spatial modulation scanner 121 of the scanning unit 120, while a Fresnel zone pattern, which is an interference pattern formed due to overlapping between the first beam as a plane wave and the second beam as a spherical wave, flies over an object, object is scanned.

Here, in order to prevent degradation in resolution, it is preferable that an extent of the plane wave is greater than an extent of the converging spherical wave on the object plane. To this end, the conical angle $\theta_1$ of the first spherical wave in the entrance pupil of the first lens system 131 is greater than or equal to the conical angle $\theta_2$ of the second spherical wave ($\theta_1 \geq \theta_2$).

Also, in addition to the focal position and conical angle condition (first condition) of the first and second spherical waves shown in FIG. 2, as an subordinate condition therefor, it is preferable that the first and second lens systems 131 and 132 satisfy Equation 2 below.

$$|\theta_1 + \theta_s| \leq |\theta_1^r|,$$

$$|\theta_2 + \theta_s| \leq |\theta_1^r|$$

$$|r_{sph1}| \leq |f_1 \alpha_1^r|$$

$$|r_{sph2}| \leq |f_1 \alpha_1^r| \qquad \text{[Equation 2]}$$

Here, $\theta_1$ and $\theta_2$ represent the conical angles (convergence half-angles) of the first and second spherical waves, $\theta_S$ represents the scan angle at the spatial modulation scanner 121 of the scanning unit 120, $\theta_1^r$ represents the acceptance angle of the first lens system, $f_1$ represents the effective focal length of the first lens system 131, $\alpha_1^r$ represents the convergence angle of the front focal plane of the first lens system 131, and $r_{sph1}$ and $r_{sph2}$ represent radii of the first and second spherical waves on the entrance pupil plane of the first lens system 131.

Here, extents of a plane wave and a spherical wave projected onto the object plane may be limited according to a size of the entrance pupil and the effective focal length of the first lens system 131, and in order to prevent degradation in resolution and degradation in field of view of a hologram due to the limitation, it is preferable that the scan angle $\theta_S$ of the spatial modulation scanner 121 of the scanning unit 120, the convergence half-angles $\theta_1$ and $\theta_2$ of the spherical waves, and the radii $r_{sph1}$ and $r_{sph2}$ of the first and second spherical waves on the entrance pupil plane of the first lens system 131 satisfy Equation 2 above.

Here, a definition of each parameter constituting a lens system is shown in FIG. 3 below. Each optical system included in the embodiment of the present invention may be modeled in the form of FIG. 3A or 3B.

FIGS. 3A and 3B show diagrams illustrating that lens systems are modeled as a general optical system and an aplanatic optical system, respectively.

First, in the case of FIG. 3A, the lens system is modeled with cardinal points and cardinal planes of the general optical system. In FIG. 3B, the lens system is modeled with cardinal points and cardinal planes of the aplanatic optical system.

When the first lens system 131 and the second lens system 132 are modeled with the cardinal points and planes of FIG. 3A or 3B, the radius of the entrance pupil for the first lens system 131 is denoted by $r_1$, an effective focal length is denoted by $f_1$, an acceptance angle is denoted by $\theta_1^r$, a radius of a field of view on the front focal plane of the first lens system 131 is denoted by $F_1$, and a convergence angle is denoted by $\alpha_1^r$.

Similarly, the radius of the entrance pupil of the second lens system 132 is denoted by $r_2$, an effective focal length is denoted by $f_2$, the acceptance angle is defined as $\theta_2^r$, the radius of the field of view in the front focal plane of the second lens system 132 is defined as $F_2$, and the convergence angle is defined as $\alpha_2^r$.

The first lens system 131 transfers, to the second lens system 132, the first spherical wave and the second spherical wave received from the scanning unit 120. At this time, in order to transfer the first spherical wave and the second spherical wave without phase distortion, the entrance pupil of the second lens system 132 is preferably at the same position as the exit pupil of the first lens system 131.

The second lens system 132 transmits the first spherical wave and the second spherical wave received from the first lens system 131 to the objective lens 133 through the second optical splitter 141. In this case, in order to transmit the first spherical wave and the second spherical wave without phase distortion and to cause the first spherical wave to be incident on the object plane of the objective lens as parallel light, it is preferable that the entrance pupil of the objective lens 133 is positioned at the same position as the exit pupil of the second lens system 132.

Here, a radius of the entrance pupil of the objective lens 133 may be denoted by $r_0$, an effective focal length may be denoted by $f_0$, an acceptance angle may be denoted by $\theta_0^r$, a radius of a field of view on a front focal plane of the objective lens 133 may be denoted by $F_0$, and a convergence angle may be denoted by $\alpha_0^r$.

The first spherical wave passing through the first lens system 131, the second lens system 132, and the objective lens 133 becomes a plane wave on the object plane of the objective lens 133. In this case, in order to prevent degradation in resolution due to scanning, it is preferable that a radius of the plane wave is less than or equal to a radius of the field of view of the objective lens 133, which may be expressed as Equation 3 below.

$$\left| (\theta_1 + \theta_s) \frac{f_0 f_1}{f_2} \right| \leq |F_{obj}| \qquad \text{[Equation 3]}$$

Here, $\theta_1$ denotes a convergence half-angle of the first spherical wave, $\theta_S$ denotes a scan angle, $F_{obj}$ denotes a radius of the field of view on the front focal plane of the objective lens 133, $f_0$ denotes the effective focal length of the objective lens 133, and $f_1$ and $f_2$ denote effective focal lengths of the first and second lens systems.

In addition, the second spherical wave passing through the first lens system 131, the second lens system 132, and the objective lens 133 becomes a spherical wave converging on the object plane of the objective lens 133. In this case, in order to prevent degradation in resolution due to scanning, it is preferable that a radius of the converging spherical wave is less than or equal to a radius of the field of view of the objective lens 133 on the object plane, which may be expressed as Equation 4 below.

$$\left| (\theta_2 + \theta_s) \frac{f_0 f_1}{f_2} \right| \leq |F_{obj}| \qquad \text{[Equation 4]}$$

Here, $\theta_2$ denotes a convergence half-angle of the second spherical wave, and the remaining parameters are the same as those in Equation 3 above.

As described above, in order to implement CASE 1, conditions of Equations 3 and 4 should be satisfied along with conditions of Equation 2.

That is, the radius of the "plane wave" on the object plane corresponding to the first spherical wave and the radius of the "converging spherical wave" on the object plane corresponding to the second spherical wave should both be less than or equal to the radius $F_{obj}$ of a field of view of the objective lens 133.

Here, in order for the first and second lens systems 131 and 132 to transmit a scan beam that satisfies matches resolution and a viewing angle of the objective lens 133 as much as possible, it is preferable that the optical invariances of the first and second lens systems 131 and 132 additionally satisfy conditions of Equation 5 below which are greater than or equal to the optical invariance of the objective lens 133.

$$I_1 \geq I_{obj}, I_2 \geq I_{obj} \quad \text{[Equation 5]}$$

Here, $I_1$, $I_2$, and $I_{obj}$ denote the optical invariances of the first lens system 131, the second lens system 132, and the objective lens 133, respectively.

In this case, when each of the lenses 131, 132, and 133 is a lens system model according to a first order principle plane, $I_1=r_1 \tan \theta_1{'}=F_1 \tan \alpha'_1$, $I_2=r_2 \tan \theta_2{'}=F_1 \tan \alpha_2{'}$, $I_{obj}=r_0 \tan \theta_0=F_0 \tan \alpha_0$. When each of the lenses 131, 132, and 133 is a paraxial approximation model, $I_1=r_1 \theta_1{'}=F_1 \alpha_1{'}$, $I_2=r_2 \theta_2{'}=F_1 \alpha_2{'}$, $I_{obj}=r_0 \theta_0=F_0 \alpha_0$. When each of the lenses 131, 132, and 133 is an aplanatic lens system, $I_1=r_1 \sin \theta_1{'}=F_t \sin \alpha_1{'}$, $I_2=r_2 \sin \theta_2{'}=F_1 \sin \alpha_2{'}$, $I_{obj}=r_0 \sin \theta_0=F_0 \sin \alpha_0$ Here, it is assumed that a lens system is present in a free space, but of course, when the lens system is present in a medium having a refractive index of n, the optical invariance becomes n times.

[CASE 2] Interference Pattern Between Diverging Spherical Wave and Plane Wave

FIG. 4 is a diagram illustrating a flying-over beam pattern scanning hologram microscope device according to the second embodiment of the present invention. FIG. 5 is a diagram illustrating first and second spherical wave generation conditions of a scan beam generation unit for forming an interference structure on an object plane according to CASE 2 of FIG. 4.

As shown in FIG. 4, a flying-over beam pattern scanning hologram microscope device 200 according to the second embodiment of the present invention mainly includes a scan beam generation unit 210, a scanning unit 120, a projection unit 130, and a light collection unit 140. Redundant descriptions of components having the same reference numerals as those in FIG. 1A will be omitted.

As described above, in the case of the second embodiment, a basic structure of a device is the same as that of the first embodiment, but a generated scan beam pattern is different from that of the first embodiment. That is, conditions of first and second spherical waves derived through first and second lenses 215 and 216 of the scan beam generation unit 210 are different from those of the first embodiment, and a principle thereof is as follows.

In the second embodiment (CASE 2), the first and second spherical waves become the plane wave and the diverging spherical wave with respect to the object plane, respectively, and the scan beam projected onto the object plane has an interference structure between the diverging spherical wave and the plane wave on the object plane.

As described above, in the case of CASE 2, the structure in which the pattern of the interference beam of the diverging spherical wave and the plane wave with respect to the object plane is used as the scan beam pattern for object scanning has a resolution equal to or higher than that of the objective lens To this end, the scan beam generation unit 210 generates the first spherical wave and the second spherical wave under a focal length and conical angle condition as shown in FIG. 5.

In the case of FIG. 5, a focal position of the first spherical wave is the same as that of an entrance pupil of a first lens system 131, a focal position of the second spherical wave is beyond the focal position of the first spherical wave to be positioned at the same position as the entrance pupil of the first lens system 131 or be positioned in rear of the entrance pupil of the first lens system 131, and at the same time, conical angles $\theta_1$ and $\theta_2$ of the first and second spherical waves satisfy $\theta_1 \geq \theta_2$.

The scan beam by the two spherical waves is transmitted to the first lens system 131 through a spatial modulation scanner 121 of the scanning unit 120. The first lens system 131 transfers the received scan beam to the second lens system 132. Here, an entrance pupil of a second lens system 132 is positioned at the same position as an exit pupil of the first lens system 131. The second lens system 132 transmits the scan beam to an objective lens 133. The objective lens 133 projects the received scan beam onto an object plane. In this case, a position of an entrance pupil of the objective lens 133 is positioned at the same position as an exit pupil of the second lens system 132.

A first beam converted into a plane wave by the first and second lens systems 131 and 132 having the above-described structure and a second beam converted into a diverging spherical wave by the first and second lens systems 131 and 132 overlap each other on the object plane on which an object is positioned. In this case, according to scanning of the spatial modulation scanner 121 of the scanning unit 120, while a Fresnel zone pattern, which is an interference pattern formed due to overlapping between the first beam as a plane wave and the second beam as a spherical wave, flies over an object, the object is scanned.

Here, in order to prevent degradation in resolution, it is preferable that an extent of the plane wave is greater than an extent of the diverging spherical wave on the object plane. To this end, as in Equation 1 above, it is preferable that a condition is satisfied in which the conical angle $\theta_1$ of the first spherical wave is greater than or equal to the conical angle $\theta_2$ of the second spherical wave.

The remaining conditions (Equations 2 to 5) of the second embodiment (CASE 2) are applied in the same manner as in the first embodiment (CASE 1).

However, in the second embodiment, the first spherical wave passing through the first lens system 131, the second lens system 132, and the objective lens 133 becomes a plane wave on the object plane of the objective lens 133, and the second spherical wave passing through the first lens system 131, the second lens system 132, and the objective lens 133 becomes a spherical wave diverging on the object plane of the objective lens 133.

Accordingly, in the case of the second embodiment, Equations 3 and 4 mean that a radius of the "plane wave" on the object plane corresponding to the first spherical wave and a radius of the "diverging spherical wave" on the object plane corresponding to the second spherical wave should both be less than or equal to a radius $F_{obj}$ of a field of view of the objective lens 133.

[CASE 3] Interference Pattern Between Diverging Spherical Wave and Diverging Plane Wave FIG. 6 is a diagram illustrating a flying-over beam pattern scanning hologram microscope device according to the third embodiment of the present invention. FIG. 7 is a diagram illustrating first and second spherical wave generation conditions of a scan beam generation unit for forming an interference structure on an object plane according to CASE 3 of FIG. 6.

As shown in FIG. 6, a flying-over beam pattern scanning hologram microscope device 300 according to the third embodiment of the present invention mainly includes a scan beam generation unit 310, a scanning unit 120, a projection unit 130, and a light collection unit 140. Redundant descriptions of components having the same reference numerals as those in FIG. 1A will be omitted.

As described above, in the case of the third embodiment, a basic structure of a device is the same as that of the first embodiment, but a generated scan beam pattern is different from that of the first embodiment. That is, conditions of first and second spherical waves derived through first and second lenses 315 and 316 of the scan beam generation unit 310 are different from those of the first embodiment, and a principle thereof is as follows.

In the third embodiment (CASE 3), both the first and second spherical waves become the diverging spherical waves with respect to the object plane, and the scan beam projected onto the object plane has an interference structure between the two diverging spherical wave on the object plane.

As described above, in the case of CASE 3, the structure in which the pattern of the interference beam of the diverging spherical waves with respect to the object plane is used as the scan beam pattern for object scanning is characterized in that the depth of field is increased.

To this end, the scan beam generation unit 310 generates the first spherical wave and the second spherical wave under a focal length and conical angle condition shown in FIG. 7.

In the case of FIG. 7, a focal position of the first spherical wave is positioned in rear of an entrance pupil of the first lens system 131, and a focal position of the second spherical wave is beyond the focal position of the first spherical wave and is positioned in rear of the focal position of the first spherical wave. In addition, at the same time, conical angles $\theta_1$ and $\theta_2$ of the first and second spherical waves have a condition that satisfies $\theta_1 \geq \theta_2$.

The scan beam by the two spherical waves is transmitted to the first lens system 131 through a spatial modulation scanner 121 of the scanning unit 120. The first lens system 131 transfers the received scan beam to the second lens system 132. Here, an entrance pupil of a second lens system 132 is positioned at the same position as an exit pupil of the first lens system 131. The second lens system 132 transmits the scan beam to an objective lens 133. The objective lens 133 projects the received scan beam onto an object plane. In this case, a position of an entrance pupil of the objective lens 133 is positioned at the same position as an exit pupil of the second lens system 132.

A first beam converted into a diverging spherical wave by the first and second lens systems 131 and 132 having the above-described structure and a second beam converted into a diverging spherical wave by the first and second lens systems 131 and 132 overlap each other on the object plane on which an object is positioned. In this case, according to scanning of the spatial modulation scanner 121 of the scanning unit 120, while a Fresnel zone pattern, which is an interference pattern formed due to overlapping between the first beam as a spherical wave and the second beam as a spherical wave, flies over an object, the object is scanned.

Here, in order to prevent degradation in resolution, it is preferable that an extent of the spherical wave that is the first beam is greater than an extent of the spherical wave, which is the second beam, on the object plane. To this end, as in Equation 1 above, it is preferable that a condition is satisfied in which the conical angle $\theta_1$ of the first spherical wave is greater than or equal to the conical angle $\theta_2$ of the second spherical wave.

The remaining conditions (Equations 2 to 5) of the third embodiment (CASE 3) are the same as those of the first embodiment (CASE 1). Also, in this case, in order to transmit the first spherical wave and the second spherical wave without phase distortion and allow the first spherical wave to be incident on the object plane of the objective lens as a spherical wave, it is preferable that an entrance pupil of the objective lens 133 is positioned at the same position as an exit pupil of the second lens system 132.

However, in the case of the third embodiment, the first spherical wave passing through the first lens system 131, the second lens system 132, and the objective lens 133 becomes a "diverging spherical wave" on the object plane of the objective lens 133. In addition, the second spherical wave passing through the first lens system 131, the second lens system 132, and the objective lens 133 also becomes a "diverging spherical wave" on the object plane of the objective lens 133.

Accordingly, in the case of the third embodiment, Equations 3 and 4 mean that a radius of the "diverging spherical wave" on the object plane corresponding to the first spherical wave and a radius of the "diverging spherical wave" on the object plane corresponding to the second spherical wave should both be less than or equal to a radius $F_{obj}$ of a field of view of the objective lens 133.

[CASE 4] Interference Pattern Between Converging Spherical Wave and Diverging Plane Wave FIG. 8 is a diagram illustrating a flying-over beam pattern scanning hologram microscope device according to the fourth embodiment of the present invention. FIG. 9 is a diagram illustrating first and second spherical wave generation conditions of a scan beam generation unit for forming an interference structure on an object plane according to CASE 4 of FIG. 8.

As shown in FIG. 8, a flying-over beam pattern scanning hologram microscope device 400 according to the fourth embodiment of the present invention mainly includes a scan beam generation unit 410, a scanning unit 120, a projection unit 130, and a light collection unit 140. Redundant descriptions of components having the same reference numerals as those in FIG. 1A will be omitted.

As described above, in the case of the fourth embodiment, a basic structure of a device is the same as that of the first embodiment, but a generated scan beam pattern is different from that of the first embodiment. That is, conditions of first and second spherical waves derived through first and second lenses 415 and 416 of the scan beam generation unit 410 are different from those of the first embodiment, and a principle thereof is as follows.

In the fourth embodiment (CASE 4), the first and second spherical waves become the converging spherical wave and the diverging spherical wave with respect to the object plane, respectively, and the scan beam projected onto the object plane has an interference structure between the converging spherical wave and the diverging spherical wave on the object plane.

As described above, in the case of CASE 4, the structure in which the pattern of the interference beam of the converging spherical wave and the diverging spherical wave on the object plane is used as the scan beam pattern for object scanning is characterized in that the resolution is more increased than the resolution of the objective lens.

To this end, the scan beam generation unit 410 generates the first spherical wave and the second spherical wave under a focal length and conical angle condition shown in FIG. 9.

In the case of FIG. 9, a focal position of the first spherical wave is the same as a position of an entrance pupil of the first lens system 131, and a focal position of the second spherical wave is the same as the position of the entrance pupil of the first lens system 131 or positioned in front of the input pupil.

In addition, at the same time, conical angles $\theta_1$ and $\theta_2$ of the first and second spherical waves have a condition that satisfies $\theta_2 < \theta_1$.

The scan beam by the two spherical waves is transmitted to the first lens system 131 through a spatial modulation scanner 121 of the scanning unit 120. The first lens system 131 transfers the received scan beam to the second lens system 132. Here, an entrance pupil of a second lens system 132 is positioned at the same position as an exit pupil of the first lens system 131. The second lens system 132 transmits the scan beam to an objective lens 133. The objective lens 133 projects the received scan beam onto the object plane. In this case, a position of an entrance pupil of the objective lens 133 is positioned at the same position as an exit pupil of the second lens system 132.

The first beam converted into a "converging spherical wave" by the first and second lens systems 131 and 132 and a second beam converted into a "diverging spherical wave" by the first and second lens systems 131 and 132 overlap each other on the object plane on which an object is positioned. In this case, according to scanning of the spatial modulation scanner, while a Fresnel zone pattern, which is an interference pattern formed due to overlapping between the first beam as a spherical wave and the second beam as a spherical wave, flies over an object, the object is scanned.

In this case, in order to prevent degradation in resolution, it is preferable that an extent of the spherical wave which is the first beam is greater than an extent of the spherical wave, which is the second beam, on the object plane. To this end, as in Equation 6 below, it is preferable that an absolute value of a difference between the conical angle $\theta_1$ of the first spherical wave and the conical angle $\theta_2$ of the second spherical wave is less than ½ of an absolute value of the sum of the conical angle $\theta_1$ of the first spherical wave and the conical angle $\theta_2$ of the second spherical wave.

$$|\theta_2 - \theta_1| < \frac{1}{2}|\theta_2 + \theta_1| \quad \text{[Equation 6]}$$

Also, in addition to a focal position and conical angle condition (fourth condition) of the first and second spherical waves shown in FIG. 8, as a subordinate condition therefor, the first and second lens systems 131 and 132 satisfy Equation 7 below.

$$|\theta_s - \theta_1| \leq |\theta_1{}^r|,$$

$$\theta_2 + \theta_s \leq \theta_1{}^r$$

$$|r_{sph1}| \leq f_1 \alpha_1{}^r$$

$$|r_{sph2}| \leq f_1 \alpha_1{}^r \quad \text{[Equation 7]}$$

Here, $\theta_1$ and $\theta_2$ represent the conical angles (convergence half-angles) of the first and second spherical waves, $\theta_S$ represents the scan angle at t the spatial modulation scanner 121, $\theta_1{}^r$ represents the acceptance angle of the first lens system 131, $f_1$ represents the effective focal length of the first lens system 131, $\alpha_1{}^r$ represents the convergence angle of the front focal plane of the first lens system 131, and $r_{sph1}$ and $r_{sph2}$ represent radii of the first and second spherical waves on the entrance pupil plane of the first lens system 131.

In order to prevent degradation in resolution and degradation in field of view due to limitations on the extents of the two spherical waves projected on an object plane according to a size of the entrance pupil and the acceptance angle of the first lens system 131, it is preferable that the radii $r_{sph1}$ and $r_{sph2}$ of the first and second spherical waves on the entrance plane of the first lens system 131 satisfy Equation 7.

The first lens system 131 transfers the first spherical wave and the second spherical wave received from the scanning unit 120 to the second lens system 132. In this case, in order to transfer the first spherical wave and the second spherical wave without phase distortion, it is preferable that an entrance pupil of the second lens system 132 is positioned at the same position as an exit pupil of the first lens system 131.

The second lens system 132 transfers the first spherical wave and the second spherical wave received from the first lens system 131 to the objective lens 133 through a second optical splitter 141. In this case, in order to transfer the first spherical wave and the second spherical wave without phase distortion and allow the first spherical wave to be incident on the object plane of the objective lens as parallel light, it is preferable that an entrance pupil of the objective lens 133 is positioned at the same position as an exit pupil of the second lens system 132.

Also, in this fourth embodiment, the first spherical wave passing through the first lens system 131, the second lens system 132, and the objective lens 133 becomes a spherical wave that converges on the object plane of the objective lens 133. In this case, in order to prevent degradation in resolution due to scanning, a radius of a spherical wave is preferably is less than or equal to a radius of the field of view of the objective lens 133, which may be expressed as Equation 8 below.

$$\left|(\theta_1 - \theta_s)\frac{f_0 f_1}{f_2}\right| \leq |F_{obj}| \quad \text{[Equation 8]}$$

Here, $\theta_1$ denotes a convergence half-angle of the first spherical wave, $\theta_S$ denotes a scan angle, $F_{obj}$ denotes a radius of the field of view on the front focal plane of the objective lens 133, $f_0$ denotes the effective focal length of the objective lens 133, and $f_1$ and $f_2$ denote effective focal lengths of the first and second lens systems.

In addition, the second spherical wave passing through the first lens system 131, the second lens system 132, and the objective lens 133 becomes a spherical wave diverging on the object plane of the objective lens 133. In this case, in order to prevent degradation in resolution due to scanning, it is preferable that a radius of the spherical wave diverging on the object plane is less than or equal to the radius of the field of view of the objective lens 133, which may be expressed as Equation 9 below.

$$\left|(\theta_2 + \theta_s)\frac{f_0 f_1}{f_2}\right| \leq |F_{obj}| \quad \text{[Equation 9]}$$

Here, $\theta_2$ denotes a convergence half-angle of the second spherical wave, and the remaining elements are the same as those in Equation 3 above.

Accordingly, in the case of the fourth embodiment, a radius of the "converging spherical wave" on the object plane corresponding to the first spherical wave and a radius of the "diverging spherical wave" on the object plane corresponding to the second spherical wave should both be less than or equal to a radius $F_{obj}$ of the field of view of the objective lens 133.

As in Equation 5, the case of the fourth embodiment also has a condition in which the optical invariances of the first and second lens systems 131 and 132 are greater than or equal to the optical invariance of the objective lens 133.

Meanwhile, in all the embodiments of FIGS. 1A, 4, 6, and 8, it is preferable that the first lens system and the second lens system may be implemented as general lenses, plano-convex lenses, doublets, and complex achromatic doublets, and are telecentric lens systems to minimize optical axis distortion due to scanning.

Accordingly, the first lens system and the second lens system may be provided as a Plossl-type eyepiece lens of U.S. Pat. No. 4,482,217 and may be provided as a telecentric lens. In addition, the first lens system may be provided as a compound scan lens, and the second lens system may be provided as a compound tube lens.

Next, a structure of a light collection unit commonly applicable to the first to fourth embodiments will be described in more detail with reference to FIG. 1A. Since a configuration of the light collection unit shown in the invention of the first embodiment of FIG. 1A are commonly applicable to the second to fourth embodiments, the configuration of FIG. 1A will be described below as a representative example.

[Light Collection Unit] Spatial Plane Light Collection Method

Referring to FIG. 1A, a scan beam pattern generated by the scan beam generation unit 110 is changed into a high-resolution Fresnel zone pattern through the objective lens 133 and is irradiated onto an object at a scanning position designated by the scanning unit 120. The irradiated beam pattern is reflected from the object and transferred to the objective lens 133. The objective lens 133 transfers the reflected beam to the third lens system 142 through the second optical splitter 141.

As described above, the light collection unit 140 of FIG. 1A includes the second optical splitter 141, the third lens system 142, and the photodetector 143 and performs spatial plane light collecting.

The second optical splitter 141 is disposed between the second lens system 132 and the objective lens 133, transfers a beam passing through the second lens system 132 to the objective lens 133, and reflects a beam, which is reflected from an object and passes through the objective lens 133 again, to the third lens system 142. The photodetector 143 detects a beam passing through the third lens system 142 and may be implemented as a photodetector.

The third lens system 142 receives a beam reflected by the optical splitter 141 and transmits the received beam to the photodetector 143. Here, a radius of an entrance pupil of the third lens system 142 may be denoted by $r_3$, an effective focal length may be denoted by $f_3$, an acceptance angle may be denoted by $\theta_3{}^r$, a radius of a field of view on a front focal plane of the third lens system 142 may be denoted by $F_3$, and a convergence angle may be denoted by $\alpha_3{}^r$.

The objective lens 133 and the third lens system 142 generate an image of an object irradiated with a beam by a Fresnel zone plate toward a detection plane of the photodetector 143 at a scanning position designated by the scanning unit 120. In this case, when the objective lens 133 is an infinitely corrected objective lens, it is preferable that a position of an entrance pupil of the third lens system 142 is the same as a position of the entrance pupil of the objective lens 133. An image of the object irradiated with the scan beam pattern is formed at a position of an exit pupil of the third lens system 142.

Here, it is preferable that the detection plane of the photodetector 143 is positioned at a position at which the image is formed, it is preferable that a size of the detection plane of the photodetector 143 is greater than or equal to a size of the image on the detection plane, which is formed by a beam reflected in an entire region irradiated with the scan beam, according to scanning, and an irradiation area does not exceed the field of view of the objective lens 133.

Therefore, in a structure of the light collection unit 140 shown in FIG. 1A, it is preferable that a size $F_{pd}$ of the detection plane of the photodetector 143 satisfies Equation 10 below.

$$\left|\frac{\theta_s f_1 f_3}{f_2}\right| \le |F_{pd}| \text{ or } \left|\frac{F_0 f_3}{f_0}\right| \le |F_{pd}| \qquad \text{[Equation 10]}$$

Here, $\theta_S$ denotes a scan angle of the spatial modulation scanner 121 of the scanning unit 120, $f_1$ to $f_3$ denote respective effective focal lengths of the first to third lens systems 131, 132, and 142, $f_0$ denotes the effective focal length of the objective lens 133, and $F_o$ denotes a radius of the field of view on the front focal plane of the objective lens 133.

The photodetector 143 generates an electrical signal proportional to the sum of light intensities on the detection plane and transmits the electrical signal to the electronic processing unit (not shown). The electronic processing unit (not shown) generates a hologram of an object by processing an electrical signal detected by the photodetector 143.

The electronic processing unit (not shown) may be different for each structure, for which reference may be made to Patent Application No. 10-2012-0002121 which is a previously applied by the present applicant.

For example, the electronic processing unit (not shown) may include a heterodyne detector, an analog-to-digital (AD) converter, a signal processing unit, a storage unit, and a scan control unit. The heterodyne detector may generate an in-phase output signal and a quartile-phase output signal using an electrical signal received from the photodetector and a heterodyne modulation signal having a frequency $\Omega$ generated by the function generator.

The AD converter receives an in-phase signal and a quartile-phase signal through each channel and converts the in-phase signal and the quartile-phase signal into digital signals. A converted digital current signal is provided to the signal processing unit together with a scanning position of a scan means. The signal processing unit generates a complex number hologram of a target (object) from the converted digital signal, and the storage unit stores the generated complex number hologram. The scan control unit generates a control signal for changing the scanning position of the scan means whenever hologram processing of a certain position of the target is completed, and transmits the control signal to the scanning unit 120.

In FIG. 1A, it is preferable that a position of the detection plane is a position of an exit pupil of the third lens system 142, that is, an image plane of the object, but the detection plane is not necessarily limited thereto. Of course, the position of the detection plane may be positioned in front or rear of the image plane. Even in this case, it is preferable that a size of the detection plane satisfies Equation 10.

Meanwhile, in the embodiment of the present invention, although it has been described that a scan beam is transmitted using the first lens system 131 and the second lens system 132 in a best mode as shown in FIG. 1A, of course, in FIG. 1A, the scanning unit 120, the second optical splitter 141, the objective lens 133, and the third lens system 142 may be provided without the first lens system 131 and the second lens system 132. In the case of in such a structure, it is preferable that a size of the detection plane satisfies Equation 11.

$$|\theta_s f_3| \leq |F_{pd}| \text{ or } \left|\frac{F_0 f_3}{f_0}\right| \leq |F_{pd}| \quad \text{[Equation 11]}$$

In the embodiment of the present invention, although it has been described that an image of an object is generated on the detection plane using the objective lens 133 and the third lens system 142 in a best mode as shown in FIG. 1A, of course, an image of an object may be formed on the detection plane only with the objective lens 133 without the third lens system 142.

In addition, in the embodiment of the present invention, the second optical splitter 141 is positioned between the second lens system 132 and the objective lens 133 in a best mode. However, the present invention is not necessarily limited thereto, and modified structures (total of three) as shown in FIGS. 10 to 12 below may be additionally proposed.

FIGS. 10 to 12 are diagrams respectively illustrating first to third modified examples of the light collection unit shown in FIG. 1A. Of course, the modified structures of the light collection unit shown in FIGS. 10 to 12 also correspond to structures applicable to all of the first to fourth embodiments of the present invention.

First, in the case of the first modified example of FIG. 10, a light collection unit 150 includes a second optical splitter 151, a third lens system 152, a fourth lens system 153, and a photodetector 154. In this case, unlike FIG. 1A, the second optical splitter 151 is positioned between a first lens system 131 and a second lens system 132, and an image is formed on a detection plane of the photodetector 154 using the third lens system 152 and the fourth lens system 153.

That is, the second optical splitter 151 is disposed between the first lens system 131 and the second lens system 132, transmits a beam passing through the first lens system 131 to the second lens system 132, and reflects a beam, which is reflected from an object and passes through the second lens system 132 through an objective lens 133, again to the third lens system 152.

The third lens system 152 receives the beam reflected by the optical splitter and transfers the received beam to the fourth lens system 153. The fourth lens system 153 receives the beam passing through the third lens system 152 and transfers the received beam to the photodetector 154. Then, the photodetector 154 detects the beam passing through the fourth lens system 153.

Here, of course, radii of entrance pupils of the third and fourth lens systems 152 and 153 may be denoted by $r_3$ and $r_4$, effective focal lengths may be denoted by $f_3$ and $f_4$, acceptance angles may be denoted by $\theta_3^r$, $\theta_4^r$, radii of fields of view on front focal planes may be denoted by $F_3$ and $F_4$, and convergence angles may be denoted by $\alpha_3^r$, $\alpha_4^r$.

In such a structure of the light collection unit 150 as shown in FIG. 10, it is preferable that a size $F_{pd}$ of the detection plane of the photodetector 154 satisfies Equation 12 below.

$$\left|\frac{\theta_s f_1 f_4}{f_3}\right| \leq |F_{pd}| \text{ or } \left|\frac{F_0 f_2 f_4}{f_0 f_3}\right| \leq |F_{pd}|. \quad \text{[Equation 12]}$$

Here, $F_{pd}$ denotes the size of the detection plane of the photodetector 154, $\theta_S$ denotes a scan angle in a spatial modulation scanner 121 of the scanning unit 120, $f_1$ to $f_4$ denote effective focal lengths of the first to fourth lens systems 132, 132, 152, and 153, $f_0$ denotes an effective focal length of the objective lens 133, and $F_o$ denotes a radius of a field of view on a front focal plane of the objective lens 133.

In the case of the above-described light collection units 140 and 150 shown in FIGS. 1A and 10, a method using a spatial plane collection method is shown. Unlike the light collection units 140 and 150, light collection units 160 and 170 shown in FIGS. 11 and 12 below correspond to a method using a spatial frequency plane light collection method.

[Light Collection Unit] Spatial Frequency Plane Light Collection Method

First, in the case of the second modified example of FIG. 11, the light collection unit 160 includes a second optical splitter 161, a third lens system 162, a fourth lens system 163, and a photodetector 164. Unlike FIG. 1A, it can be seen that a fourth lens system is added between the third lens system and the photodetector.

The scan beam pattern generated by a scan beam generation unit 110 is changed into a high-resolution Fresnel zone pattern through an objective lens 133 and is irradiated onto an object at a scanning position designated by a scanning unit 120. The irradiated beam pattern is reflected from the object and transmitted to the objective lens 133.

That is, the second optical splitter 161 transmits a beam passing through the second lens system 131 to the objective lens 133 and reflects a beam, which is reflected from an object and passes through the objective lens 133 again, and transmits the reflected beam to the third lens system 162. The third lens system 162 receives the beam and transmits the received beam to the fourth lens system 163, and the fourth lens system 163 transmits the received beam to a detection plane of the photodetector 164.

In this case, it is preferable that an exit pupil of the objective lens 133 is positioned to be coplanar with an entrance pupil of the third lens system 162, an exit pupil of the third lens system 162 is positioned at the same position as an entrance pupil of the fourth lens system 163, and the detection plane of the photodetector 164 is positioned on an exit pupil of the fourth lens system 163. That is, it is preferable that the objective lens 133, the third lens system 162, and the fourth lens system 163 are positioned as an afocal system.

A spatial frequency-converted light distribution of an image on an object plane of the objective lens 133 is generated on the detection plane of light of the photodetector 164 having such a photodetection structure.

In this case, it is preferable that a size $F_{pd}$ of the detection plane of the photodetector is greater than or equal to 0.1 times the product of an effective numerical aperture of a scan beam transmitted to the object plane and a focal length of the fourth lens system 163 as in Equation 13 below.

$$|0.1 f_4 NA_{eff}| \leq |F_{pd}| \quad \text{[Equation 13]}$$

Here, $f_4$ denotes an effective focal length of the fourth lens system 163, and $NA_{eff}$ denotes the effective numerical aperture of the beam wave transferred to the object plane and is defined as a difference $NA_{eff}=|NA_1-NA_2|$ between a numerical aperture $NA_1$ of a first spherical wave wave transferred to the object plane and a numerical aperture $NA_2$ of a second spherical wave.

At this time, $NA_1=\sin(\Omega_1)$ and $NA_2=\sin(\Omega_2)$. $\Omega_1$ and $\Omega_2$ are the divergence angles of the beam viewed from the object plane. In the case of a diverging spherical wave with positive divergence, $\Omega_1$ and $\Omega_2$ are positive divergence angles. In the case of a converging spherical wave with negative divergence, $\Omega_1$ and $\Omega_2$ are negative divergence angles. In the case of the plane wave, $\Omega_1$ and $\Omega_2$ are 0.

In the case of the first embodiment (CASE 1) of FIG. 1A, since a first spherical wave becomes a plane wave on an object plane, $NA_1=0$, and since a second spherical wave is a spherical wave converging on the object plane, $$NA_2 = -\sin\left(\frac{f_2 r_{sph2}}{f_0 f_1}\right).$$

In the case of the second embodiment (CASE 2) of FIG. 4, since a first spherical wave becomes a plane wave on an object plane, $NA_1=0$, and since a second spherical wave is a spherical wave diverging on the object plane, $$NA_2 = \sin\left(\frac{f_2 r_{sph2}}{f_0 f_1}\right)$$

In the case of the third embodiment (CASE 3) of FIG. 6, since a first spherical wave becomes a spherical wave diverging on an object plane, $$NA_1 = \sin\left(\frac{f_2 r_{sph1}}{f_0 f_1}\right),$$

and since a second spherical wave is a spherical wave diverging on the object plane, $$NA_2 = \sin\left(\frac{f_2 r_{sph2}}{f_0 f_1}\right).$$

In the case of the fourth embodiment (CASE 4) of FIG. 8, since a first spherical wave becomes a spherical wave converging on an object plane, $$NA_1 = -\sin\left(\frac{f_2 r_{sph1}}{f_0 f_1}\right),$$

and since a second spherical wave is a spherical wave diverging on the object plane, $$NA_2 = \sin\left(\frac{f_2 r_{sph2}}{f_0 f_1}\right).$$

Next, in the case of the fourth modified example of FIG. 12, a light collection unit 170 includes a second optical splitter 171, a third lens system 172, and a photodetector 173. In this case, unlike FIG. 1A, the second optical splitter 171 is positioned between the first lens system 131 and the second lens system 132.

The scan beam pattern generated by a scan beam generation unit 110 is changed into a high-resolution Fresnel zone pattern through an objective lens 133 and is irradiated onto an object at a scanning position designated by a scanning unit 120. The irradiated beam pattern is reflected from the object and transmitted to the objective lens 133.

The objective lens 133 transmits the reflected beam to the second optical splitter 171 through the second lens system 132. The second optical splitter 171 reflects the received beam to the third lens system 172, and the third lens system 172 receives the beam and transmits the received beam to a detection plane of the photodetector 173.

In this case, it is preferable that an exit pupil of the objective lens 133 is positioned to be coplanar with an entrance pupil of the third lens system 132, an exit pupil of the second lens system 132 is positioned at the same position as an entrance pupil of the third lens system 172, and the detection plane of the photodetector 164 is positioned on an exit pupil of the third lens system 172. That is, it is preferable that the objective lens 133, the second lens system 132, and the third lens system 172 are positioned as an afocal system.

A spatial frequency-converted light distribution of an image on an object plane of the objective lens 133 is generated on the detection plane of light of the photodetector 173 having such a light detection structure.

In this case, it is preferable that a size $F_{pd}$ of the detection plane of the photodetector is greater than or equal to 0.1 times the product of an effective numerical $NA_{eff}$ of a scan beam transferred to the object plane and a focal length $f_3$ of the third lens system 172 as in Equation 14 below.

$$|0.1 f_3 NA_{eff}| \leq |F_{pd}| \qquad \text{[Equation 14]}$$

In such a structure, in the case of the first embodiment (CASE 1) of FIG. 1A, since a first spherical wave becomes a plane wave on an object plane, $NA_1=0$, and a second spherical wave is a spherical wave converging on the object plane, $$NA_2 = -\sin\left(\frac{f_2 r_{sph2}}{f_0 f_1}\right).$$

In the case of the second embodiment (CASE 2) of FIG. 4, since a first spherical wave becomes a plane wave on an object plane, $NA_1=0$, and since a second spherical wave is a spherical wave diverging on the object plane, $$NA_2 = \sin\left(\frac{f_2 r_{sph2}}{f_0 f_1}\right).$$

In the case of the third embodiment (CASE 3) of FIG. 6, since a first spherical wave becomes a spherical wave diverging on an object plane, $$NA_1 = \sin\left(\frac{f_2 r_{sph1}}{f_0 f_1}\right),$$

and since a second spherical wave is a spherical wave diverging on the object plane, $$NA_2 = \sin\left(\frac{f_2 r_{sph2}}{f_0 f_1}\right).$$

In the case of the fourth embodiment (CASE 4) of FIG. 8, since a first spherical wave becomes a spherical wave converging on an object plane, $$NA_1 = -\sin\left(\frac{f_2 r_{sph1}}{f_0 f_1}\right),$$

and since a second spherical wave is a spherical wave diverging on the object plane, $$NA_2 = \sin\left(\frac{f_2 r_{sph2}}{f_0 f_1}\right).$$

Meanwhile, in the structure of FIG. 1A, for example, when an object is a fluorescent body, a dichroic mirror may be used instead of the second optical splitter 141. The dichroic mirror may be disposed between the scanning unit 120 and the fluorescent body, may transmit an interference beam incident by the scanning unit 120 to the fluorescent body, and may reflect and transmit a fluoresced beam incident from the fluorescent body to the photodetector 164. The dichroic mirror is a light transmission means and transmits a fluoresced beam emitted from the fluorescent body to the photodetector in a process of scanning the fluorescent body. The dichroic mirror is inclined at a set angle between the scanning unit and the fluorescent body. The dichroic mirror may be a mirror designed to selectively reflect light according to a wavelength, and in the present embodiment, may be designed to transmit an interference beam and reflect a fluorescence beam. That is, the dichroic mirror transmits an interference beam incident by the scanning unit to the fluorescent body and reflects a fluoresced beam incident from the fluorescent body to transmit the fluoresced beam to the photodetector. In this way, the dichroic mirror is implemented to transmit a wavelength of the interference beam and reflect a wavelength of the beam fluoresced by the fluorescent body. Here, of course, each wavelength range of the interference beam and the fluoresced beam corresponds to a value known in advance.

According to this, the interference beam (interference pattern) for scanning the phosphor is transmitted through the dichroic mirror and transferred to the phosphor. In addition, the fluorescent beam emitted from the phosphor during scanning is reflected immediately upon reaching the dichroic mirror and transferred to the photodetector through the third lens system.

According to the present invention as described above, the high-resolution Fresnel zone pattern is formed as the scanning beam pattern on the object plane through the objective lens, and the beam reflected from the object is imaged on the detection plane of the photodetector through the objective lens while the flying-over scan is performed, thereby implementing a high-resolution scanning hologram microscope at high speed.

The present invention has been described with reference to the embodiments illustrated in the drawings, but this is only an example. It will be understood by those of ordinary skill in the art that various modifications and equivalents thereto may be made thereto. Accordingly, the true technical protection scope of the present invention should be defined by the technical spirit of the appended claims.

The invention claimed is:

1. A flying-over beam pattern scanning hologram microscope device comprising:
a scan beam generation unit which modulates a phase of a first beam split from a light source to convert the first beam to a first spherical wave through a first lens, converts a second beam to a second spherical wave through a second lens, and then allows the first and second spherical waves to interfere with each other to form a scan beam;
a scanning unit which comprises a spatial modulation scanner for controlling the incident scan beam in a horizontal direction to be transferred to a projection unit, so as to control a scanning position of the scan beam for an object in horizontal and vertical directions, and a translation stage for moving the object in the vertical direction at a rear end of the projection unit;
the projection unit which comprises multiple lens systems and an objective lens and projects the scan beam transferred from the scanning unit onto an object plane on which the object is placed; and
a light collection unit which detects a beam that has passed through the objective lens again after fluorescing or being reflected from an object,
wherein the scan beam projected onto the object plane has different patterns according to focal position and conical angle conditions of each of the first and second spherical waves formed on the spatial modulation scanner.

2. The flying-over beam pattern scanning hologram microscope device of claim 1, wherein:
the spatial modulation scanner is one selected from among a spatial light modulator (SLM), a digital micromirror device (DMD), and an acousto-optic deflector; and
when a scanning control signal is input, an interval between grating patterns is gradually changed over time to control the scan beam in the vertical or horizontal direction.

3. The flying-over beam pattern scanning hologram microscope device of claim 1, wherein the scan beam projected onto the object plane is determined as one of an interference structure between a converging spherical wave and a plane wave on the object plane according to focal position and conical angle conditions of each of the first and second spherical waves formed on the spatial modulation scanner, an interference structure between a diverging spherical wave and the plane wave on the object plane, an interference structure between two diverging spherical waves on the object plane, and an Interference structure between the converging spherical wave and the diverging spherical wave on the object plane.

4. The flying-over beam pattern scanning hologram microscope device of claim 1, wherein the projection unit comprises a first lens system, a second lens system, and the objective lens sequentially disposed between the scanning unit and the object plane; and an entrance pupil of the first lens system is located in the spatial modulation scanner.

5. The flying-over beam pattern scanning hologram microscope device of claim 4, wherein, when a condition is a first condition, the first and second spherical waves become a plane wave and a converging spherical wave with respect to the object plane, respectively, so that the scan beam projected onto the object plane has an interference structure between the converging spherical wave and the plane wave on the object plane, and
the first condition is a condition that a focal position of the first spherical wave is as same as a position of the entrance pupil of the first lens system, a focal position of the second spherical wave is as same as the position of the entrance pupil of the first lens system or in front of the entrance pupil of the first lens system, and conical angles ($\theta_1$, $\theta_2$) of the first and second spherical waves satisfy $\theta_2 \leq \theta_1$.

6. The flying-over beam pattern scanning hologram microscope device of claim 4, wherein, when a condition is a second condition, the first and second spherical waves become a plane wave and a diverging spherical wave with respect to the object plane, respectively, so that the scan beam projected onto the object plane has an interference structure between the diverging spherical wave and the plane wave on the object plane, and the second condition is a condition that a focal position of the first spherical wave is as same as a position of the entrance pupil of the first lens system, a focal position of the second spherical wave is as same as the position of the entrance pupil of the first lens system or behind the entrance pupil of the first lens system, and conical angles ($\theta_1$, $\theta_2$) of the first and second spherical waves satisfy $\theta_2 \leq \theta_1 \leq 2\theta_2$.

7. The flying-over beam pattern scanning hologram microscope device of claim 4, wherein, when a condition is a third condition, both the first and second spherical waves become diverging spherical waves with respect to the object plane, so that the scan beam projected onto the object plane has an interference structure between the two diverging spherical waves on the object plane, and the third condition is a condition that a focal position of the first spherical wave is behind the entrance pupil of the first lens system, a focal position of the second spherical wave is behind the focal position of the first spherical wave, and conical angles ($\theta_1$, $\theta_2$) of the first and second spherical waves satisfy $\theta_2 \leq \theta_1$.

8. The flying-over beam pattern scanning hologram microscope device of claim 4, wherein, when a condition is a fourth condition, the first and second spherical waves become a converging spherical wave and a diverging spherical wave with respect to the object plane, respectively, so that the scan beam projected onto the object plane has an interference structure between the converging spherical wave and the diverging spherical wave on the object surface, and the fourth condition is a condition that a focal position of the first spherical wave is in front of the entrance pupil of the first lens system, a focal position of the second spherical wave is behind the entrance pupil of the first lens system, and conical angles ($\theta_1$, $\theta_2$) of the first and second spherical waves satisfy $\theta_2 < \theta_1$ and satisfy Equation below:

$$|\theta_2 - \theta_1| < \frac{1}{2}|\theta_2 + \theta_1|.$$

9. The flying-over beam pattern scanning hologram microscope device of claim 5, wherein the first lens system transfers a received scan beam to the second lens system, and the first and second lens systems satisfy conditions of Equation below:

$|\theta_1 + \theta_s| \leq |\theta_1^r|,$ $\theta_2 + \theta_s| \leq |\theta_1^r|$ $|r_{sph1}^1| \leq |f_1 \alpha_1^r|$ $|r_{sph2}^1| \leq |f_1 \alpha_1^r|$ wherein, $\theta_1$ and $\theta_2$ represent the conical angles of the first and second spherical waves, $\theta_S$ represents a scan angle at the spatial modulation scanner of the scanning unit, $\theta_1^r$ represents an acceptance angle of the first lens system, $f_1$ represents an effective focal length of the first lens system, $\alpha_1^r$ represents a convergence angle of a front focal plane of the first lens system, and $r_{sph1}$ and $r_{sph2}$ represent radii of the first and second spherical waves on an entrance pupil plane of the first lens system.

10. The flying-over beam pattern scanning hologram microscope device of claim 6, wherein the first lens system transfers a received scan beam to the second lens system, and the first and second lens systems satisfy conditions of Equation below:

$|\theta_1 + \theta_s| \leq |\theta_1^r|,$ $\theta_2 + \theta_s| \leq |\theta_1^r|$ $|r_{sph1}^1| \leq |f_1 \alpha_1^r|$ $|r_{sph2}^1| \leq |f_1 \alpha_1^r|$ wherein, $\theta_1$ and $\theta_2$ represent the conical angles of the first and second spherical waves, $\theta_S$ represents a scan angle at the spatial modulation scanner of the scanning unit, $\theta_1^r$ represents an acceptance angle of the first lens system, $f_1$ represents an effective focal length of the first lens system, $\alpha_1^r$ represents a convergence angle of a front focal plane of the first lens system, and $r_{sph1}$ and $r_{sph2}$ represent radii of the first and second spherical waves on an entrance pupil plane of the first lens system.

11. The flying-over beam pattern scanning hologram microscope device of claim 7, wherein the first lens system transfers a received scan beam to the second lens system, and the first and second lens systems satisfy conditions of Equation below:

$|\theta_1 + \theta_s| \leq |\theta_1^r|,$ $\theta_2 + \theta_s| \leq |\theta_1^r|$ $|r_{sph1}^1| \leq |f_1 \alpha_1^r|$ $|r_{sph2}^1| \leq |f_1 \alpha_1^r|$ wherein, $\theta_1$ and $\theta_2$ represent the conical angles of the first and second spherical waves, $\theta_S$ represents a scan angle at the spatial modulation scanner of the scanning unit, $\theta_1^r$ represents an acceptance angle of the first lens system, $f_1$ represents an effective focal length of the first lens system, $\alpha_1^r$ represents a convergence angle of a front focal plane of the first lens system, and $r_{sph1}$ and $r_{sph2}$ represent radii of the first and second spherical waves on an entrance pupil plane of the first lens system.

12. The flying-over beam pattern scanning hologram microscope device of claim 8, wherein the first lens system transfers a received scan beam to the second lens system, and the first and second lens systems satisfy conditions of Equation below:

$|\theta_s - \theta_1| \leq |\theta_1^r|,$ $\theta_2 + \theta_s \leq \theta_1^r$ $r_{sph1} \leq f_1 \alpha_1^r$ $r_{sph2} \leq f_1 \alpha_1^r$ wherein, $\theta_1$ and $\theta_2$ represent the conical angles of the first and second spherical waves, $\theta_S$ represents a scan angle at the spatial modulation scanner of the scanning unit, $\theta_1^r$ represents an acceptance angle of the first lens system, $f_1$ represents an effective focal length of the first lens system, $\alpha_1{}^r$ represents a convergence angle of a front focal plane of the first lens system, and $r_{sph1}$ and $r_{sph2}$ represent radii of the first and second spherical waves on an entrance pupil plane of the first lens system.

13. The flying-over beam pattern scanning hologram microscope device of claim 9, wherein both of a radius of the plane wave on the object plane corresponding to the first spherical wave and a radius of the converging spherical wave on the object plane corresponding to the second spherical wave are smaller than or equal to a radius of field of view of the objective lens as shown in Equation below:

$$\left|(\theta_1+\theta_s)\frac{f_0 f_1}{f_2}\right| \le |F_{obj}|, \left|(\theta_2+\theta_s)\frac{f_0 f_1}{f_2}\right| \le |F_{obj}|,$$

wherein $\theta_1$ and $\theta_2$ represent the conical angles of the first and second spherical waves, $\theta_S$ represents a scan angle at the spatial modulation scanner of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

14. The flying-over beam pattern scanning hologram microscope device of claim 10, wherein both of a radius of the plane wave on the object plane corresponding to the first spherical wave and a radius of the diverging spherical wave on the object plane corresponding to the second spherical wave are smaller than or equal to a radius of field of view of the objective lens as shown in Equation below:

$$\left|(\theta_1+\theta_s)\frac{f_0 f_1}{f_2}\right| \le |F_{obj}|, \left|(\theta_2+\theta_s)\frac{f_0 f_1}{f_2}\right| \le |F_{obj}|,$$

wherein $\theta_1$ and $\theta_2$ represent the conical angles of the first and second spherical waves, $\theta_S$ represents a scan angle at the spatial modulation scanner of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

15. The flying-over beam pattern scanning hologram microscope device of claim 11, wherein both of a radius of the diverging spherical wave on the object plane corresponding to the first spherical wave and a radius of the diverging spherical wave on the object plane corresponding to the second spherical wave are smaller than or equal to a radius of field of view of the objective lens as shown in Equation below:

$$\left|(\theta_1+\theta_s)\frac{f_0 f_1}{f_2}\right| \le |F_{obj}|, \left|(\theta_2+\theta_s)\frac{f_0 f_1}{f_2}\right| \le |F_{obj}|,$$

wherein $\theta_1$ and $\theta_2$ represent the conical angles of the first and second spherical waves, $\theta_S$ represents a scan angle at the spatial modulation scanner of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

16. The flying-over beam pattern scanning hologram microscope device of claim 12, wherein both of a radius of the converging spherical wave on the object plane corresponding to the first spherical wave and a radius of the diverging spherical wave on the object plane corresponding to the second spherical wave are smaller than or equal to a radius of field of view of the objective lens as shown in Equation below:

$$\left|(\theta_1+\theta_s)\frac{f_0 f_1}{f_2}\right| \le |F_{obj}|, \left|(\theta_2+\theta_s)\frac{f_0 f_1}{f_2}\right| \le |F_{obj}|,$$

wherein $\theta_1$ and $\theta_2$ represent the conical angles of the first and second spherical waves, $\theta_S$ represents a scan angle at the spatial modulation scanner of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

17. The flying-over beam pattern scanning hologram microscope device of claim 4, wherein the light collection unit comprises:
a optical splitter which is disposed between the second lens system and the objective lens, and which transfers the beam passing through the second lens system to the objective lens, and reflects the beam reflected from the object and passing through the objective lens to the outside;
a third lens system which receives the beam reflected by the optical splitter; and
a photodetector which detects a beam passing through the third lens system,
wherein a size of a detection plane of the photodetector satisfies Equation below:

$$\left|\frac{\theta_s f_1 f_3}{f_2}\right| \le |F_{pd}|, \left|\frac{F_0 f_3}{f_0}\right| \le |F_{pd}|.$$

wherein $F_{pd}$ represents the size of the detection plane, $\theta_S$ represents a scan angle at the spatial modulation scanner of the scanning unit, $f_1$ to $f_3$ represent effective focal lengths of the first to third systems, $f_0$ represents an effective focal length of the objective lens, and $F_o$ represents a radius of a field of view in a front focal plane of the objective lens.

18. The flying-over beam pattern scanning hologram microscope device of claim 4, wherein the light collection unit comprises:
a optical splitter which is disposed between the first lens system and the second lens system, and which transfers the beam passing through the first lens system to the second lens system, and reflects the beam reflected from the object and passing the second lens system through the objective lens to the outside;
a third lens system which receives the beam reflected by the optical splitter;
a fourth lens system which receives the beam passing through the third lens system; and
a photodetector which detects a beam passing through the fourth lens system, wherein a size of a detection plane of the photodetector satisfies Equation below:

$$\left|\frac{\theta_s f_1 f_4}{f_3}\right| \le |F_{pd}| \frac{FF}{FF} \left|\frac{F_0 f_2 f_4}{f_0 f_3}\right| \le |F_{pd}|,$$

wherein $F_{pd}$ represents the size of the detection plane, $\theta_s$ represents a scan angle at the spatial modulation scanner of the scanning unit, $f_1$ to $f_4$ represent effective focal lengths of the first to fourth systems, $f_0$ represents an effective focal length of the objective lens, and $F_o$ represents a radius of a field of view in a front focal plane of the objective lens.

19. The flying-over beam pattern scanning hologram microscope device of claim 4, wherein the light collection unit comprises:
a optical splitter which is disposed between the second lens system and the objective lens, and which transfers the beam passing through the second lens system to the objective lens, and reflects the beam reflected from the object and passing the objective lens to the outside;
a third lens system which receives the beam reflected by the optical splitter;
a fourth lens system which receives the beam passing through the third lens system; and
a photodetector which detects a beam passing through the fourth lens system,
wherein a spatial frequency-converted light distribution of an image on the object plane of the objective lens is generated on a detection plane of the photodetector, and a size of the detection plane of the photodetector satisfies Equation below:

$$|0.1 f_4 NA_{\it eff}| \le |F_{pd}|,$$

wherein $F_{pd}$ represents the size of the detection plane of the photodetector, $f_4$ represents an effective focal length of the fourth lens system, and $NA_{\it eff}$ represents an effective numerical aperture of the beam transferred to the object plane and is defined as a difference between a numerical aperture ($NA_1$) of the first spherical wave and a numerical aperture ($NA_2$) of the second spherical wave, the first spherical wave and the second spherical wave being transferred to the object plane.

20. The flying-over beam pattern scanning hologram microscope device of claim 4, wherein the light collection unit comprises:
a optical splitter which is disposed between the first lens system and the second lens system, and which transfers the beam passing through the first lens system to the second lens system, and reflects the beam reflected from the object and passing the second lens system through the objective lens to the outside;
a third lens system which receives the beam reflected by the optical splitter; and
a photodetector which detects a beam passing through the third lens system,
wherein a spatial frequency-converted light distribution of an image on the object plane of the objective lens is generated on a detection plane of the photodetector, and a size of the detection plane of the photodetector satisfies Equation below:

$$|0.1 f_3 NA_{\it eff}| \le |F_{pd}|,$$

wherein $F_{pd}$ represents the size of the detection plane of the photodetector, $f_3$ represents an effective focal length of the third lens system, and $NA_{\it eff}$ represents an effective numerical aperture of the beam transferred to the object plane and is defined as a difference between a numerical aperture ($NA_1$) of the first spherical wave and a numerical aperture ($NA_2$) of the second spherical wave, the first spherical wave and the second spherical wave being transferred to the object plane.

* * * * *